US012801269B2

(12) United States Patent (10) Patent No.: US 12,801,269 B2
Mao et al. (45) Date of Patent: Nov. 17, 2026

(54) APPLICATION ICON DISPLAY METHOD AND RELATED APPARATUS

(71) Applicant: Honor Device Co., Ltd., Shenzhen (CN)

(72) Inventors: Chengkun Mao, Shenzhen (CN); Jinlong Zhao, Shenzhen (CN)

(73) Assignee: Honor Device Co., Ltd., Shenzhen (CN)

( * ) Notice: Subject to any disclaimer, the term of this patent is extended or adjusted under 35 U.S.C. 154(b) by 187 days.

(21) Appl. No.: 18/691,269

(22) PCT Filed: May 5, 2023

(86) PCT No.: PCT/CN2023/092131
§ 371 (c)(1),
(2) Date: Mar. 12, 2024

(87) PCT Pub. No.: WO2023/236693
PCT Pub. Date: Dec. 14, 2023

(65) Prior Publication Data
US 2024/0385737 A1 Nov. 21, 2024

(30) Foreign Application Priority Data
Jun. 7, 2022 (CN) ......................... 202210637073.6

(51) Int. Cl.
*G06F 3/04845* (2022.01)
*G06F 3/04817* (2022.01)

(52) U.S. Cl.
CPC ...... *G06F 3/04845* (2013.01); *G06F 3/04817* (2013.01)

(58) Field of Classification Search
CPC ......................... G06F 3/04845; G06F 3/04817
See application file for complete search history.

(56) References Cited

U.S. PATENT DOCUMENTS 10,607,380 B2 3/2020 Ekstrand et al.
11,137,876 B2 10/2021 Gao
(Continued)

FOREIGN PATENT DOCUMENTS

CN 105302540 A 2/2016
CN 106383709 A 2/2017
(Continued)

*Primary Examiner* — Mahelet Shiberou
(74) *Attorney, Agent, or Firm* — Leydig, Voit & Mayer, Ltd.

(57) ABSTRACT

Disclosed are an application icon display method and a related apparatus. The method implemented by a first terminal device includes: displaying a first interface based on receiving migration data; starting to import the migration data; displaying a second interface in a process in which the first terminal device imports the migration data, wherein the second interface includes a first control; displaying a first desktop in response to a user operation of selecting the first control, wherein the first desktop includes a first icon of a first application and a first import progress of the first application, and an icon status of the first application is a first status; and updating the icon status of the first application to a second status on the first desktop when the import progress of the first application changes.

18 Claims, 14 Drawing Sheets

(56) References Cited

U.S. PATENT DOCUMENTS

| | | | | |
|---|---|---|---|---|
| 2012/0072871 | A1* | 3/2012 | Seo | H04N 21/472 715/838 |
| 2012/0096386 | A1 | 4/2012 | Baumann et al. | |
| 2013/0332886 | A1* | 12/2013 | Cranfill | G06F 3/0482 715/835 |
| 2014/0298214 | A1 | 10/2014 | Machalani et al. | |
| 2016/0321066 | A1 | 11/2016 | Wang et al. | |
| 2017/0097956 | A1* | 4/2017 | Kim | G06F 16/2428 |
| 2020/0110529 | A1 | 4/2020 | Gao | |
| 2020/0379946 | A1 | 12/2020 | Coffman et al. | |

FOREIGN PATENT DOCUMENTS

| | | | |
|---|---|---|---|
| CN | 106468998 | A | 3/2017 |
| CN | 106970868 | A | 7/2017 |
| CN | 108021373 | A | 5/2018 |

* cited by examiner

Interface A

CONT. FROM FIG. 3A

Interface B

TO

Interface A

CONT. FROM FIG. 4A

Interface B

TO FIG. 4C

CONT. FROM FIG. 4B

TO FIG. 4D

Interface C

CONT. FROM

Interface D

CONT. FROM FIG. 7A

Interface B

APPLICATION ICON DISPLAY METHOD AND RELATED APPARATUS

CROSS-REFERENCE TO RELATED APPLICATIONS

This application is a national stage of International Application No. PCT/CN2023/092131, filed on May 5, 2023, which claims priority to Chinese Patent Application No. 202210637073.6, filed on Jun. 7, 2022. The disclosures of both of the aforementioned applications are hereby incorporated by reference in their entireties.

TECHNICAL FIELD

Embodiments of this application relate to the field of terminals, and more specifically, to an application icon display method and a related apparatus.

BACKGROUND

In a scenario where a user uses a new phone, the user can migrate data on an old mobile phone to the new mobile phone through a data migration application.

Currently, the new mobile phone can provide the user with an entrance to the desktop during data migration. After entering the desktop, the desktop can display application icons, and users can view which applications are waiting to be imported.

However, currently users cannot intuitively understand an application import progress, resulting in a poor display effect during data migration.

SUMMARY

Embodiments of this application provide an application icon display method and a related apparatus, which is conducive to allowing users to intuitively understand an import progress of an application, improving a display effect of application icons during data migration.

According to a first aspect, an application icon display method is provided. The method includes: establishing, by a first terminal device, a connection to a second terminal device: displaying, by the first terminal device, a first interface when the first terminal device receives migration data sent by the second terminal device, where the first interface includes one or more of a data volume, a transmission progress, or transmission time of the migration data: starting, by the first terminal device, to import the migration data in a case that the first terminal device has finished receiving the migration data: displaying, by the first terminal device, a second interface in a process in which the first terminal device imports the migration data, where the second interface includes a first control: displaying, by the first terminal device, a first desktop in response to a user operation of selecting the first control, where the first desktop includes a first icon of a first application and a first import progress of the first application, and an icon status of the first application is a first status; and updating, by the first terminal device, the icon status of the first application to a second status on the first desktop when the import progress of the first application changes, where the second status includes a second icon of the first application and a second import progress.

In this application, the first terminal device and the second terminal device establish a connection to perform data migration. The first terminal device is a receiving end of the migration data, and the second terminal device is a sending end of the migration data. When the first terminal device determines that the migration data has been received, the first terminal device starts to import the migration data, displays the second interface for the user, and provides the user with the first control for entering the desktop in the second interface. After the user selects the first control, the first terminal device can import the migration data in the background and display the first desktop for the user. The first desktop can display the icon status of the application. Through the icon status of the application, the user can intuitively understand the import progress of the application, which improves the display effect of the application icon during data migration and improves the user experience.

With reference to the first aspect, in some implementations of the first aspect, the first status includes a waiting for import state. The updating, by the first terminal device, the icon status of the first application to a second status on the first desktop when the import progress of the first application changes includes: updating, by the first terminal device, the icon status of the first application to an installing state on the first desktop when the import progress of the first application changes from waiting for import to application installing.

In this application, the first terminal device can detect whether the first application is installed in the first terminal device. If the first application is not installed, the first terminal device can start application installing, so that the import progress of the first application is changed from waiting for import to application installing. Correspondingly, the first terminal device updates the icon status of the first application from the waiting for import state to the installing state on the first desktop.

With reference to the first aspect, in some implementations of the first aspect, the first status includes a waiting for import state. The updating, by the first terminal device, the icon status of the first application to a second status on the first desktop when the import progress of the first application changes includes: updating, by the first terminal device, the icon status of the first application to an importing state on the first desktop when the import progress of the first application changes from waiting for import to importing application data.

In this application, the first terminal device can detect whether the first application is installed in the first terminal device and whether there is application data of the first application. If the first application has been installed and there is application data of the first application, the first terminal device can start importing application data, so that the import progress of the first application is changed from waiting for import to importing application data. Correspondingly, the first terminal device updates the icon status of the first application from the waiting for import state to the importing state on the first desktop.

With reference to the first aspect, in some implementations of the first aspect, the first status includes a waiting for import state. The updating, by the first terminal device, the icon status of the first application to a second status on the first desktop when the import progress of the first application changes includes: updating, by the first terminal device, the icon status of the first application to an import completion state on the first desktop when the import progress of the first application changes from waiting for import to completed import.

In this application, the first terminal device can detect whether the first application is installed in the first terminal device and whether there is application data of the first application. If the first application has been installed and there is no application data of the first application, the first terminal device determines that the import of the first application is completed, so that the import progress of the first application is changed from waiting for import to completed import. Correspondingly, the first terminal device updates the icon status of the first application from the waiting for import state to the import completion state on the first desktop.

With reference to the first aspect, in some implementations of the first aspect, the first status includes an installing state. The updating, by the first terminal device, the icon status of the first application to a second status on the first desktop when the import progress of the first application changes includes: updating, by the first terminal device, the icon status of the first application to an importing state on the first desktop when the import progress of the first application changes from application installing to importing application data.

In this application, after installing the first application, if the first terminal device determines that there is application data of the first application, the first terminal device can start importing application data, so that the import progress of the first application is changed from application installing to importing application data. Correspondingly, the first terminal device updates the icon status of the first application from the installing state to the importing state on the first desktop.

With reference to the first aspect, in some implementations of the first aspect, the first status includes an installing state. The updating, by the first terminal device, the icon status of the first application to a second status on the first desktop when the import progress of the first application changes includes: updating, by the first terminal device, the icon status of the first application to an import completion state on the first desktop when the import progress of the first application changes from application installing to completed import.

In this application, after installing the first application, if the first terminal device determines that there is no application data of the first application, the first terminal device determines that the import of the first application is completed, so that the import progress of the first application is changed from application installing to completed import. Correspondingly, the first terminal device updates the icon status of the first application from the installing state to the import completion state on the first desktop.

With reference to the first aspect, in some implementations of the first aspect, the first status includes an importing state. The updating, by the first terminal device, the icon status of the first application to a second status on the first desktop when the import progress of the first application changes includes: updating, by the first terminal device, the icon status of the first application to an import completion state on the first desktop when the import progress of the first application changes from importing application data to completed import.

In this application, after import of the application data of the first application is completed, the first terminal device can determine that import of the first application is completed, so that the import progress of the first application is changed from importing application data to completed import. Correspondingly, the first terminal device refreshes the icon status of the first application from the importing state to the import completion state on the first desktop.

With reference to the first aspect, in some implementations of the first aspect, the first terminal device includes an import module and a desktop module. The updating, by the first terminal device, the icon status of the first application to a second status on the first desktop when the import progress of the first application changes includes: detecting, by the first terminal device, the import progress of the first application through the import module: sending, by the first terminal device, a first broadcast to the desktop module through the import module when detecting a change in the import progress, where the first broadcast indicates to update the icon status of the first application: receiving, by the first terminal device, the first broadcast through the desktop module; and updating, by the first terminal device, the icon status of the first application to the second status on the first desktop based on the first broadcast through the desktop module.

In this application, the import module is mainly responsible for installing applications and importing application data, refreshing notification icon statuses, performing heartbeat broadcasts of import processes, and the like. The desktop module is mainly responsible for realizing icon placement of application icons on the desktop, refreshing icon statuses, and the like.

With reference to the first aspect, in some implementations of the first aspect, the method further includes: sending, by the first terminal device, first indication information to the desktop module through the import module, where the first indication information indicates a position of the icon of the first application on the first desktop: receiving, by the first terminal device, the first indication information through the desktop module; and placing, by the first terminal device, the icon of the first application on the first desktop based on the first indication information through the desktop module.

In this application, the import module of the first terminal device can receive desktop layout information from the second terminal device. After obtaining the desktop layout information, the import module can send the first indication information to the desktop module to indicate the position of the icon of the first application on the desktop. Based on the first indication information, the desktop module can place the icon of the first application on the first desktop (which may also be referred to as icon placeholder). In this way, the layout of application icons on the desktop is more in line with usage habits of the user, improving the user experience.

With reference to the first aspect, in some implementations of the first aspect, the method further includes: clearing, by the first terminal device, icons of target applications from the first desktop in a case of detecting that a user operation is a predefined operation, where the target applications include applications that have not been installed.

In this application, the predefined operation includes an operation of clearing a cloning application, or an operation of canceling an import process. For the predefined operation of the user, the first terminal device can stop the import of the application and clear icons of the applications that have not been installed on the desktop. Because the applications that have not been installed cannot be used normally by the user, the method of clearing the icons of the target applications on the desktop is helpful to avoid disturbing use of the application by the user.

With reference to the first aspect, in some implementations of the first aspect, the starting, by the first terminal device, to import the migration data in a case that the first terminal device has finished receiving the migration data includes: receiving, by the first terminal device, second indication information from the second terminal device, where the second indication information indicates that all the migration data has been sent; and starting, by the first terminal device, to import the migration data in a case of determining based on the second indication information that the migration data has been received.

According to a second aspect, an application icon display apparatus is provided, configured to perform the method in any possible implementation of the first aspect. Specifically, the apparatus includes modules for performing the method in any possible implementation of the first aspect.

According to a third aspect, another application icon display apparatus is provided, including a processor and a memory. The processor is coupled to the memory. The memory can be used to store a computer program. The processor can be used to call and execute the computer program in the memory, to implement the method in any possible implementation of the first aspect.

In an implementation, the application icon display apparatus is a first terminal device. When the application icon display apparatus is the first terminal device, a communication interface may be a transceiver or an input/output interface.

In another implementation, the application icon display apparatus is a chip configured in the first terminal device. When the application icon display apparatus is a chip configured in the first terminal device, the communication interface may be an input/output interface.

According to a fourth aspect, a processor is provided, including: an input circuit, an output circuit, and a processing circuit. The processing circuit is configured to receive signals through the input circuit and transmit signals through the output circuit, so that the processor performs the method in any possible implementation of the first aspect.

In a specific implementation process, the foregoing processor may be a chip, the input circuit may be an input pin, the output circuit may be an output pin, and the processing circuit may be a transistor, a gate circuit, a flip-flop, and various logic circuits. An input signal received by the input circuit may be received and input by, for example, but not limited to, a receiver, and a signal output by the output circuit may be, for example, but not limited to, output to and transmitted by the transmitter. The input circuit and the output circuit may be the same circuit that functions as an input circuit and an output circuit at different moments. The specific implementation of the processor and various circuits is not limited in this application.

According to a fifth aspect, a processing apparatus is provided, including a processor and a memory. The processor is configured to read instructions stored in the memory, and can receive signals through a receiver and transmit signals through a transmitter, to perform the method in any possible implementation of the first aspect.

Optionally, there are one or more processors, and there are one or more memories.

Optionally, the memory and the processor may be integrated together, or the memory and the processor may be separately disposed.

In a specific implementation process, the memory may be a non-transitory memory, such as a read-only memory ROM). The memory and the processor may be integrated into one chip, or may be separately disposed in different chips. A type of the memory and a manner in which the memory and the processor are disposed are not limited in this application.

It should be understood that the relevant data interaction process, for example, sending indication information may be a process of outputting the indication information from the processor, and receiving capability information may be a process of the processor receiving the input capability information. Specifically, data output by the processor can be output to the transmitter, and the input data received by the processor can come from the receiver. The transmitter and receiver may be collectively referred to as a transceiver.

The processing apparatus in the fifth aspect may be a chip, and the processor can be implemented by hardware or software. When implemented by hardware, the processor may be a logic circuit, an integrated circuit, or the like; and when implemented by software, the processor may be a general-purpose processor, and is implemented by reading software code stored in the memory. The memory can be integrated in the processor, or can be located outside the processor and exist independently.

According to a sixth aspect, a computer program product is provided. The computer program product includes computer program code. When the computer program code is run, a computer is enabled to perform the method according to any possible implementation of the first aspect.

According to a seventh aspect, a computer-readable storage medium is provided. The computer-readable storage medium stores a computer program. When the computer program is run, a computer is enabled to perform the method in any possible implementation of the first aspect.

DESCRIPTION OF EMBODIMENTS

The following describes technical solutions of this application with reference to accompanying drawings.

To clearly describe technical solutions in embodiments of this application, terms such as “first” and “second” are used in embodiments of this application to distinguish between same items or similar items that provide basically same functions or purposes. For example, a first control and a second control are merely for distinguishing between different controls, and are not intended to limit a sequence thereof. A person skilled in the art may understand that the terms such as "first" and "second" do not limit a quantity or an execution sequence, and the terms such as "first" and "second" do not indicate a definite difference.

It should be noted that, in this application, the term "exemplary." or "for example" is used to represent giving an example, an illustration, or a description. Any embodiment or design scheme described as "exemplary" or "for example" in this application should not be construed as being more preferable or more advantageous than other embodiments or design schemes. Exactly, the terms such as "exemplary" or "for example" are intended to present related concepts in a specific manner.

In addition, "at least one" means one or more, and "a plurality of" means two or more. And/or describes an association relationship between associated objects, and represents that three relationships may exist. For example, A and/or B may represent the following cases: Only A exists, both A and B exist, and only B exists, where A and B may be singular or plural. The character "/" generally indicates an "or" relationship between the associated objects. At least one of the following items (pieces) or a similar expression thereof refers to any combination of these items, including any combination of singular items (pieces) or plural items (pieces). For example, at least one item (piece) of a, b, or c may represent a, b, c, a and b, a and c, b and c, or a, b, and c, where a, b, and c may be singular or plural.

Figure 1:
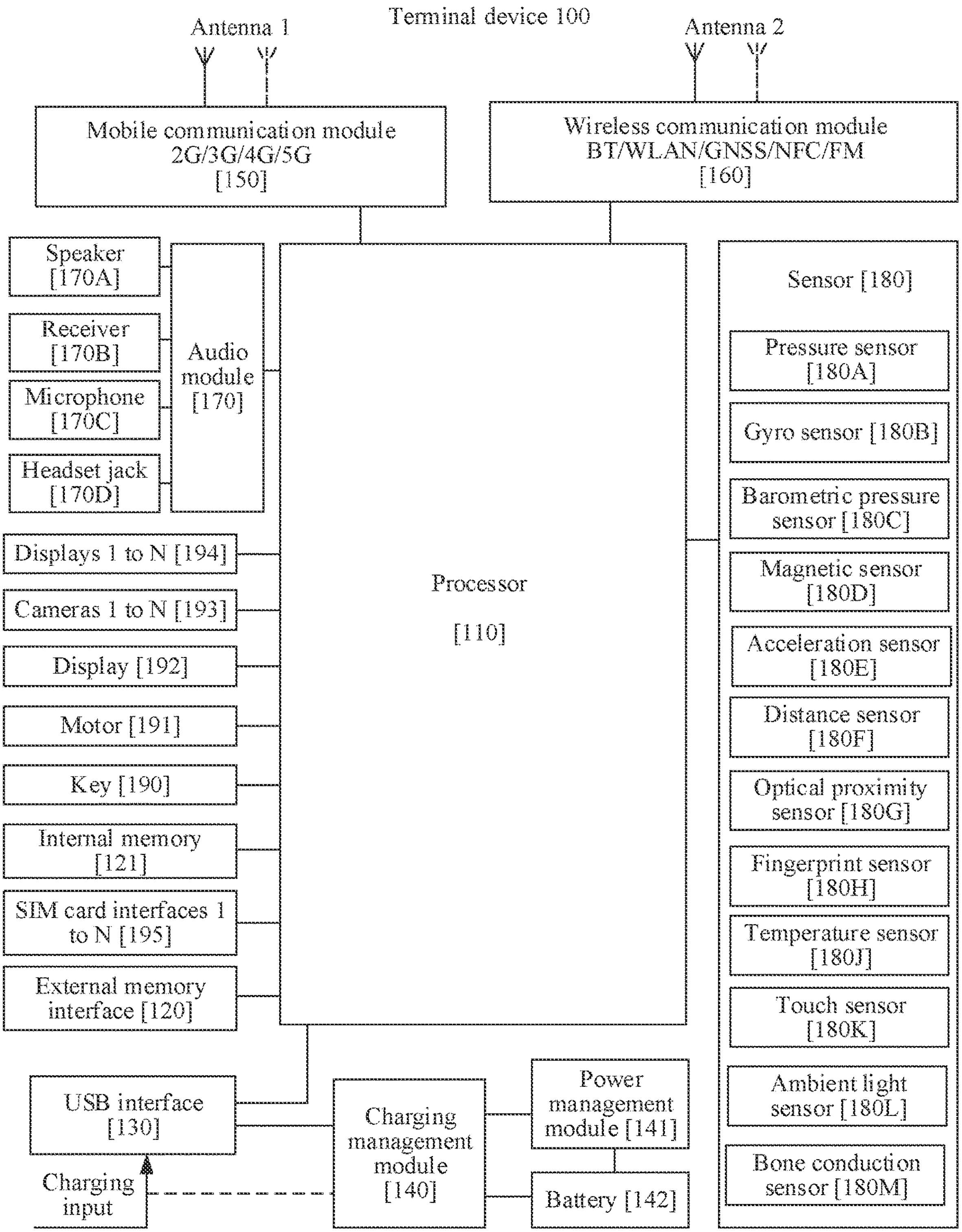
FIG. 1 is a schematic diagram of a structure of a terminal device applicable to an embodiment of this application.

FIG. 1 is a schematic diagram of a structure of a terminal device applicable to an embodiment of this application. As shown in FIG. 1, a terminal device 100 includes: a processor 110, an external memory interface 120, an internal memory 121, a universal serial bus (USB) interface 130, a charging management module 140, a power management unit 141, a battery 142, an antenna 1, an antenna 2, a mobile communication module 150, a wireless communication module 160, an audio module 170, a speaker 170A, a phone receiver 170B, a microphone 170C, a headset jack 170D, a sensor 180, a key 190, a motor 191, an indicator 192, a camera 193, a display 194, a subscriber identification module (SIM) card interface 195, and the like.

It may be understood that the structure shown in this embodiment does not constitute a specific limitation on the terminal device 100. In some other embodiments of this application, the terminal device 100 may include more or fewer components than those shown in the figure, or some components may be combined, some components may be split, or the components may be differently arranged. The components shown in the figure may be implemented by hardware, software, or a combination of software and hardware.

The processor 110 may include one or more processing units. For example, the processor 110 may include an application processor (AP), a modem processor, a graphics processing unit (GPU), an image signal processor (ISP), a controller, a video codec, a digital signal processor (DSP), a baseband processor, a display processing unit (DPU), a neural-network processing unit (NPU), and/or the like. Different processing units may be independent devices, or may be integrated into one or more processors. In some embodiments, the terminal device 100 may alternatively include one or more processors 110. The processor may be a nerve center and a command center of the terminal device 100. The processor may generate an operation control signal based on instruction operation code and a timing signal, to complete control of instruction fetching and instruction execution. A memory may be further disposed in the processor 110, and is configured to store instructions and data. In some embodiments, the memory in the processor 110 is a cache. The memory may store instructions or data used or cyclically used by the processor 110. If the processor 110 needs to use the instructions or the data again, the processor may directly invoke the instructions or the data from the memory. This avoids repeated access, reduces a waiting time of the processor 110, and improves efficiency of the terminal device 100.

In some embodiments, the processor 110 may include one or more interfaces. The interface may include an inter-integrated circuit (I2C) interface, an inter-integrated circuit sound (I2S) interface, a pulse code modulation (PCM) interface, a universal asynchronous receiver/transmitter (UART) interface, a mobile industry processor interface (MIPI), a general-purpose input/output (GPIO) interface, a subscriber identity module (SIM) interface, a USB interface, and the like. The USB interface 130 is an interface that conforms to a USB standard specification, and may be specifically a mini USB interface, a micro USB interface, a USB type-C interface, or the like. The USB interface 130 may be configured to connect to a charger to charge the terminal device 100, or may be configured to transmit data between the terminal device 100 and a peripheral device. Alternatively, the USB interface may be configured to connect to a headset for playing audio through the headset.

It can be understood that the interface connection relationship between the modules illustrated in embodiments of this application is an example for description, and does not constitute a limitation on the structure of the terminal device 100. In some other embodiments of this application, the terminal device 100 may alternatively use an interface connection manner different from that in the foregoing embodiment, or use a combination of a plurality of interface connection manners.

A wireless communication function of the terminal device 100 may be implemented by using the antenna 1, the antenna 2, the mobile communication module 150, the wireless communication module 160, a modem processor, a baseband processor, and the like. The antenna 1 and the antenna 2 are configured to transmit and receive an electromagnetic wave signal. Each antenna in the terminal device 100 may be configured to cover a single or a plurality of communication bands. Different antennas may be further multiplexed to improve antenna utilization. For example, the antenna 1 may be multiplexed to a diversity antenna of a wireless local area network. In some other embodiments, the antenna may be used in combination with a tuning switch.

The mobile communication module 150 may provide a solution used for wireless communication including 2G, 3G, 4G, 5G, and the like on the terminal device 100. The mobile communication module 150 may include at least one filter, a switch, a power amplifier, a low noise amplifier, and the like. The mobile communication module 150 may receive an electromagnetic wave through the antenna 1, perform processing such as filtering or amplification on the received electromagnetic wave, and transmit the electromagnetic wave to the modem processor for demodulation. The mobile communication module 150 may further amplify a signal modulated by the modem processor, and convert the signal into an electromagnetic wave for radiation through the antenna 1. In some embodiments, at least some functional modules of the mobile communication module 150 may be disposed in the processor 110. In some embodiments, at least some functional modules of the mobile communication module 150 and at least some modules of the processor 110 may be disposed in a same device.

The modem processor may include a modulator and a demodulator. The modulator is configured to modulate a to-be-sent low-frequency baseband signal into a medium- and high-frequency signal. The demodulator is configured to demodulate a received electromagnetic wave signal into a low-frequency baseband signal. The demodulator then transmits the low-frequency baseband signal obtained through demodulation to the baseband processor for processing. The low-frequency baseband signal is processed by the baseband processor and then transmitted to the application processor. The application processor outputs a sound signal by an audio device (not limited to the speaker 170A, the receiver 170B, or the like), or displays an image or a video by the display 194. In some embodiments, the modem processor may be an independent component. In some other embodiments, the modem processor may be independent of the processor 110, and is disposed in a same device as the mobile communication module 150 or another functional module.

The wireless communication module 160 may provide a solution to wireless communication applied to the terminal device 100, for example, a wireless local area network (WLAN), Bluetooth, a global navigation satellite system (GNSS), frequency modulation (FM), NFC, and an infrared (IR) technology. The wireless communication module 160 may be one or more devices integrating at least one communication processing module. The wireless communication module 160 receives an electromagnetic wave through the antenna 2, performs frequency modulation and filtering processing on an electromagnetic wave signal, and sends a processed signal to the processor 110. The wireless communication module 160 may further receive a to-be-sent signal from the processor 110, perform frequency modulation and amplification on the signal, and convert the signal into an electromagnetic wave for radiation through the antenna 2.

In some embodiments, the antenna 1 of the terminal device 100 is coupled to the mobile communication module 150, and the antenna 2 is coupled to the wireless communication module 160, so that the terminal device 100 can communicate with a network and another device by using a wireless communication technology. The wireless communication technology may include GSM, GPRS, CDMA, WCDMA, TD-SCDMA, LTE, GNSS, WLAN, NFC, FM, an IR technology, and/or the like. The GNSS may include a global positioning system (GPS), a global navigation satellite system (GLONASS), a BeiDou navigation satellite system (BDS), a quasi-zenith satellite system (QZSS), and/or a satellite based augmentation system (SBAS).

The terminal device 100 can implement a display function by using the GPU, the display 194, the application processor, and the like. The application processor may include an NPU and/or a DPU. The GPU is a microprocessor for image processing, and is connected to the display 194 and the application processor. The GPU is configured to perform mathematical and geometric calculation, and is configured to render an image. The processor 110 may include one or more GPUs, which execute instructions to generate or change display information. The NPU is a neural-network (NN) computing processor, and quickly processes input information by using a biological neural network structure such as a mode of transmission between human-brain nerve cells, and may further constantly perform self-learning. Applications such as intelligent cognition of the terminal device 100 may be implemented through the NPU, for example, image recognition, facial recognition, speech recognition, and text understanding. The DPU is also referred to as a display sub-system (DSS). The DPU is configured to adjust the color of the display 194. The DPU can adjust the color of the display through a color three-dimensional lookup table (3D look up table, 3D LUT). The DPU can also perform image scaling, noise reduction, contrast enhancement, backlight brightness management, hdr processing, display parameter Gamma adjustment, and the like.

The display 194 is configured to display an image, a video, and the like. The display 194 includes a display panel. The display panel may be a liquid crystal display (LCD), an organic light-emitting diode (OLED), an active-matrix organic light emitting diode (AMOLED), a flexible light-emitting diode (FLED), a Miniled, a MicroLed, a Micro-oLed, a quantum dot light emitting diode (QLED), or the like. In some embodiments, the terminal device 100 may include 1 or N displays 194. N is a positive integer greater than 1.

The terminal device 100 may implement a photographing function by using the ISP, one or more cameras 193, the video codec, the GPU, one or more displays 194, the application processor, and the like.

The external memory interface 120 may be configured to connect to an external storage card, for example, a Micro SD card, to extend a storage capability of the terminal device 100. The external memory card communicates with the processor 110 through the external memory interface 120, to implement a data storage function. For example, data files such as music, photos, and videos are stored in the external memory card.

The internal memory 121 may be configured to store one or more computer programs, and the one or more computer programs include instructions. The processor 110 may run the instructions stored in the internal memory 121, to enable the terminal device 100 to implement various functional applications and data processing. The internal memory 121 may include a program storage area and a data storage area. The program storage area can store an operating system: the program storage area can also store one or more applications (such as a gallery and contacts). The data storage region can store data (for example, photos and contacts) and the like created during use of the terminal device 100. In addition, the internal memory 121 may include a high-speed random access memory, and may further include a non-volatile memory, for example, at least one magnetic disk storage device, a flash memory device, or a universal flash storage (UFS), and the like. In some embodiments, the processor 110 may run the instructions stored in the internal memory 121 and/or the instructions stored in the memory disposed in the processor 110, to cause the terminal device 100 to implement various functional applications and data processing.

The terminal device 100 may use the audio module 170, the speaker 170A, the receiver 170B, the microphone 170C, the headset jack 170D, the application processor, and the like to implement an audio function, for example, music playback and sound recording. The audio module 170 is configured to convert digital audio information into an analog audio signal for output, and is also configured to convert analog audio input into a digital audio signal. The audio module 170 may be further configured to code and decode an audio signal. In some embodiments, the audio module 170 may be disposed in the processor 110, or some functional modules in the audio module 170 are disposed in the processor 110. The speaker 170A, also referred to as a "loudspeaker", is configured to convert an audio electrical signal into a sound signal. The terminal device 100 may be used to listen to music or answer a call in a hands-free mode over the speaker 170A. The receiver 170B, also referred to as an "earpiece", is configured to convert an electrical audio signal into a sound signal. When a call is answered or speech information is received through the terminal device 100, the receiver 170B may be put close to a human ear to listen to a voice. The microphone 170C, also referred to as a "mike" or a "mic", is configured to convert a sound signal into an electrical signal. When making a call or sending a voice message, a user may make a sound near the microphone 170C through the mouth of the user, to input a sound signal to the microphone 170C. At least one microphone 170C may be arranged in the terminal device 100. In some other embodiments, two microphones 170C may be disposed in the terminal device 100, to collect a sound signal and implement a noise reduction function. In some other embodiments, three, four, or more microphones 170C may alternatively be disposed in the terminal device 100, to collect a sound signal, implement noise reduction, and identify a sound source, to implement a directional recording function and the like. The headset jack 170D is configured to connect to a wired headset. The headset jack 170D may be a USB interface 130, or may be a 3.5 mm open mobile terminal platform (OMTP) standard interface or cellular telecommunications industry association of the USA (CTIA) standard interface.

The sensor 180 may include a pressure sensor 180A, a gyro sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

The terminal device in this embodiment of this application may be a handheld device with a wireless connection function, an in-vehicle device, or the like. The terminal device may also be referred to as a terminal, user equipment (UE), a mobile station (MS), a mobile terminal (MT), or the like. Currently, some examples of the terminal device are a mobile phone, a tablet computer, a smart television, a notebook computer, a tablet computer (Pad), a palmtop computer, a mobile internet device (MID), a virtual reality (VR) device, an augmented reality (AR) device, a wireless terminal in industrial control, a wireless terminal in self driving, a wireless terminal in remote medical surgery, a wireless terminal in a smart grid, a wireless terminal in transportation safety, a wireless terminal in a smart city, a wireless terminal in a smart home, a cellular phone, a cordless phone, a session initiation protocol (SIP) phone, a wireless local loop (WLL) station, a personal digital assistant (PDA), a handheld device or a computing device having a wireless communication function or another processing device, an in-vehicle device, or a wearable device connected to a wireless modem, a terminal device in a 5G network, a terminal device in a future evolved public land mobile network (PLMN), and the like. The specific technology and the specific device form used by the terminal device are not limited in embodiments of this application.

As an example instead of a limitation, in embodiments of this application, the terminal device may alternatively be a wearable device. The wearable device may also be referred to as a wearable intelligent device, and is a generic term for wearable device such as glasses, gloves, watches, clothes, and shoes that are developed by applying wearable technologies to intelligent designs of daily wear. The wearable device is a portable device that can be directly worn on the body or integrated into clothes or an accessory of a user. The wearable device is not only a hardware device, but also implements a powerful function through software support, data exchange, and cloud interaction. Generalized wearable intelligent devices include full-featured and large-size devices that can implement complete or partial functions without depending on smartphones, such as smart watches or smart glasses, and devices that focus on only one type of application function and need to work with other devices such as smartphones, such as various smart bands or smart jewelry for monitoring physical signs.

It should be understood that, in embodiments of this application, the terminal device may be an apparatus configured to implement a function of the terminal device, or may be an apparatus, for example, a chip system, that can support the terminal device in implementing the function. The apparatus may be installed in the terminal. In embodiments of this application, the chip system may include a chip, or may include a chip and another discrete device.

The terminal device in embodiments of this application may also be referred to as a user equipment (UE), a mobile station (MS), a mobile terminal (MT), an access terminal, a subscriber unit, a subscriber station, a mobile station, a mobile console, a remote station, a remote terminal, a mobile device, a user terminal, a terminal, a wireless communication device, a user agent, or a user apparatus. The terminal device being a mobile phone is used as an example for description below:

The software system of the terminal device 100 may use a layered architecture, an event-driven architecture, a microkernel architecture, a micro-service architecture, or a cloud architecture. This embodiment of this application uses an Android system with a layered architecture as an example to illustrate the software structure of the terminal device 100.

Figure 2:
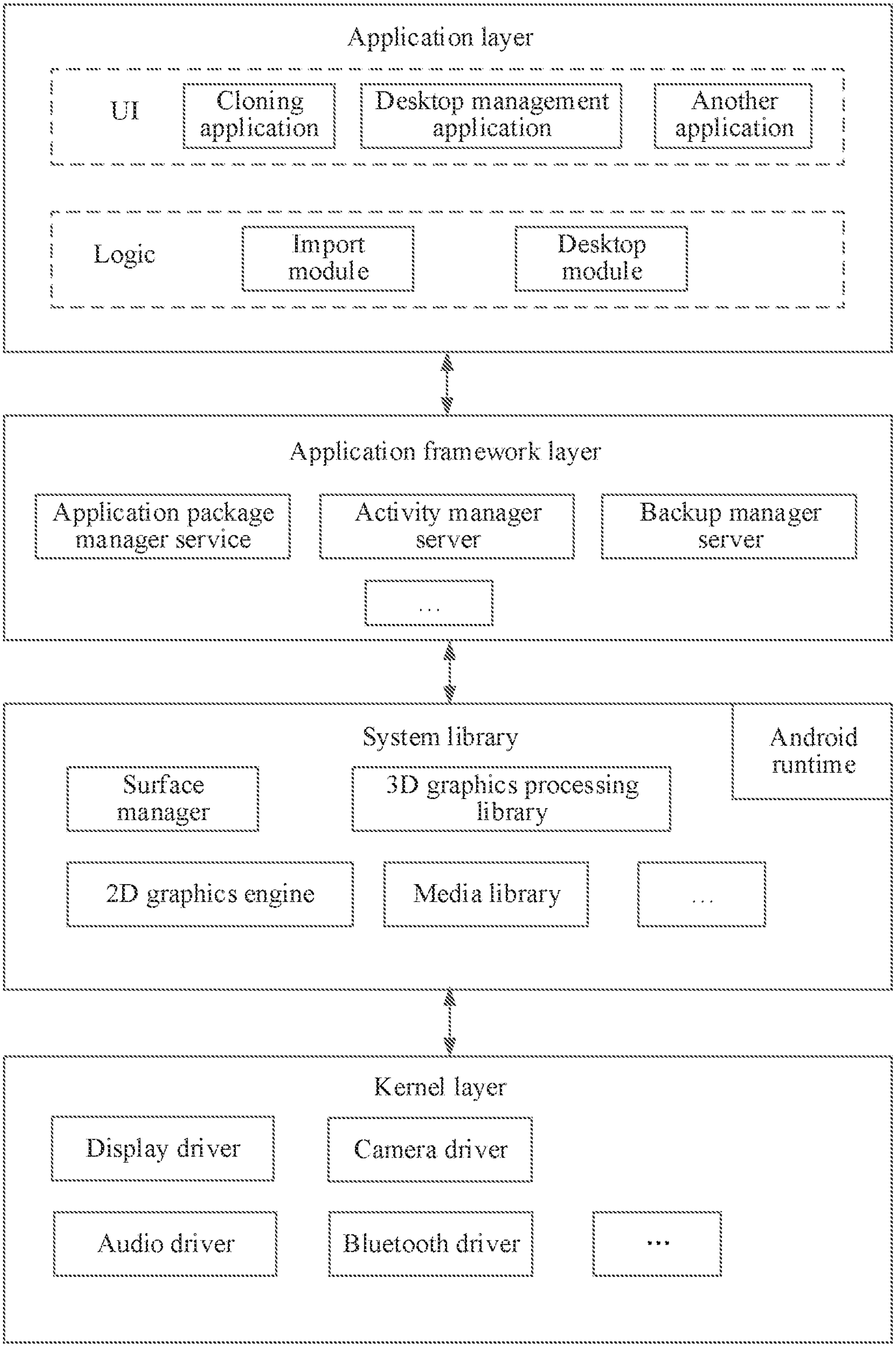
FIG. 2 is a block diagram of a software structure of a terminal device applicable to an embodiment of this application.

FIG. 2 is a block diagram of a software structure of a terminal device applicable to an embodiment of this application. In the layered architecture, the software system of the terminal device 100 is divided into several layers, and each layer has a clear role and task. Layers communicate with each other through software interfaces. In some embodiments, the Android system can be divided into an application layer (APP), an application framework layer (application framework), an Android runtime, a system library, and a kernel layer (kernel).

The application layer may include a series of application packages. The application layer runs applications by calling an application programming interface (API) provided by the application framework layer.

As shown in FIG. 2, the application layer may include a user interface (UI) layer and a logic layer. The UI layer may include cloning applications, desktop management applications, and other applications. Other applications may include cameras, calendars, maps, phones, Music, WLAN, Bluetooth, video, social, gallery, navigation, short messages, and other applications. The logic layer includes an import module and a desktop module, where the terminal device 100 can implement a function of a cloning application in the form of a software functional module (for example, the import module). The terminal device 100 can implement the functions of the desktop management application in the form of a software functional module (for example, the desktop module).

The application framework layer provides APIs and programming frameworks for applications in the application layer. The application framework layer includes some predefined functions. As shown in FIG. 2, the application framework layer may include application package manager service (PMS), an activity manager service (AMS), a backup manager service (BMS), and the like.

The PMS is used to manage and track installation, parsing, control permissions, and the like of application packages of applications.

The AMS is mainly responsible for startup, switching, and scheduling of the four major components in the Android system (provider component, service component, receiver component, and activity component), as well as the management and scheduling of application processes.

The BMS can be used to bind or unbind backup entities. After binding backup entities, protection of the four major components can be started.

The application framework layer may further include: a window manager, a content provider, a resource manager, a notification manager, a view system, a phone manager, and the like. This is not limited in embodiments of this application.

The Android runtime includes a core library and a virtual machine. The Android runtime is responsible for scheduling and management of an Android system. The core library includes two parts: functions to be invoked by java language, and a core library of Android. The application layer and the application framework layer are run on the virtual machine. The virtual machine executes java files of the application layer and the application framework layer as binary files. The virtual machine is configured to implement functions such as object life cycle management, stack management, thread management, security and exception management, and garbage collection. The system library may include a plurality of functional modules, for example, a surface manager, a media library (media libraries), a 3D graphics processing library (for example, OpenGL ES), and a 2D graphics engine (for example, SGL).

The surface manager is configured to manage a display subsystem and provide fusion of 2D and 3D layers for a plurality of applications. The media library supports play back and recording of audio and videos in various commonly used formats, still image files, and the like. The media library supports a plurality of audio and video encoding formats. The 3D graphics processing library is configured to implement 3D graphics drawing, image rendering, compositing, layer processing, and the like. The 2D graphics engine is a drawing engine for 2D drawing.

The kernel layer is a layer between hardware and software. The kernel layer is configured to drive the hardware and make the hardware work. The kernel layer includes at least a display driver, an audio driver, a camera driver, a Bluetooth driver, and the like. This is not limited in embodiments of this application.

Generally, in a scenario where a user uses a new phone, the user can migrate data on an old mobile phone to the new mobile phone through a data migration APP (for example, a cloning application). Data migration may include two stages: data transmission and data import. The data transmit stage includes transmitting data from the old mobile phone to the new mobile phone; and the data import stage includes application installing on the new mobile phone and importing application data.

It should be understood that application installing and importing application data are two different stages. Application installing refers to installing an application package. An example is used in which the user installs WeChat® on the new mobile phone. After installing WeChat® on the new mobile phone, the user can use WeChat®. However, because the application data is not imported, the installed WeChat® cannot provide the user with information such as an address book, chat records, and collection contents on the old mobile phone. After the application data is imported, the application installed on the new mobile phone can provide the user with the application data on the old mobile phone, which provides convenience for the user to use the new phone.

However, in the current data migration scenario, the user cannot intuitively understand the import progress of the application, and the display effect of the application icon is not good.

In view of this, embodiments of this application provide an application icon display method and a related apparatus, so that the terminal device can provide an entrance to the desktop during the data migration. After the terminal device enters the desktop through this entrance, data can be imported in the background. During the data import, the terminal device can display the import progress of the application in real time on the desktop. Applications at different import progresses correspond to different icon statuses. In this way, during the data import, through different icon statuses, the user can intuitively understand the current import progress of the application, which improves the display effect of the application icon in the data migration scenario and improves the user experience.

For ease of description, in this embodiment of this application, the new terminal device in the data migration scenario is referred to as the first terminal device, and the old terminal device in the data migration scenario is referred to as the second terminal device. The first terminal device and the second terminal device may have structures as shown in FIG. 1 and/or FIG. 2, but this is not limited in embodiments of this application.

Figure 3A:
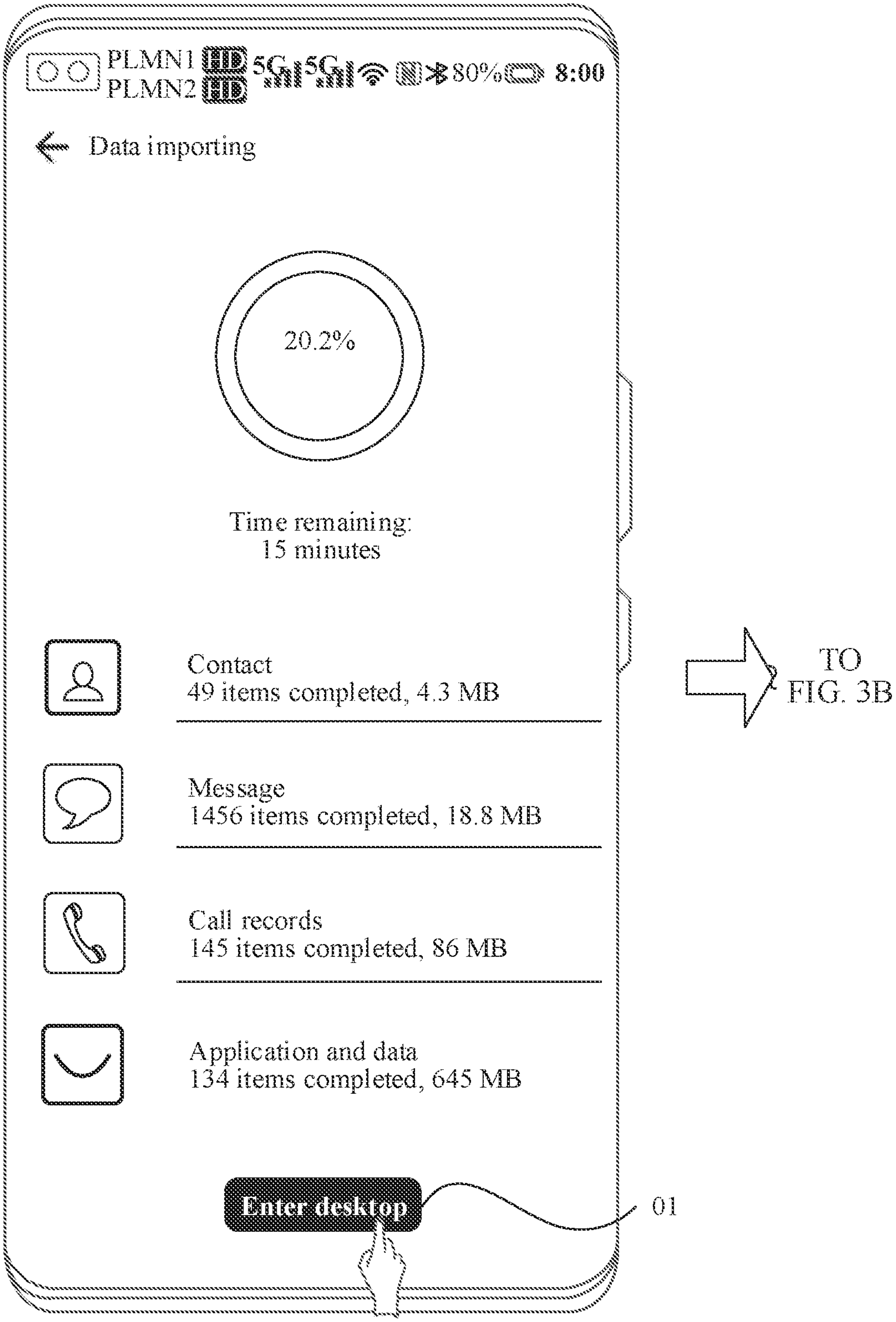
FIG. 3A and FIG. 3B are schematic diagrams of interfaces for entering a desktop according to an embodiment of this application.
Figure 3B:
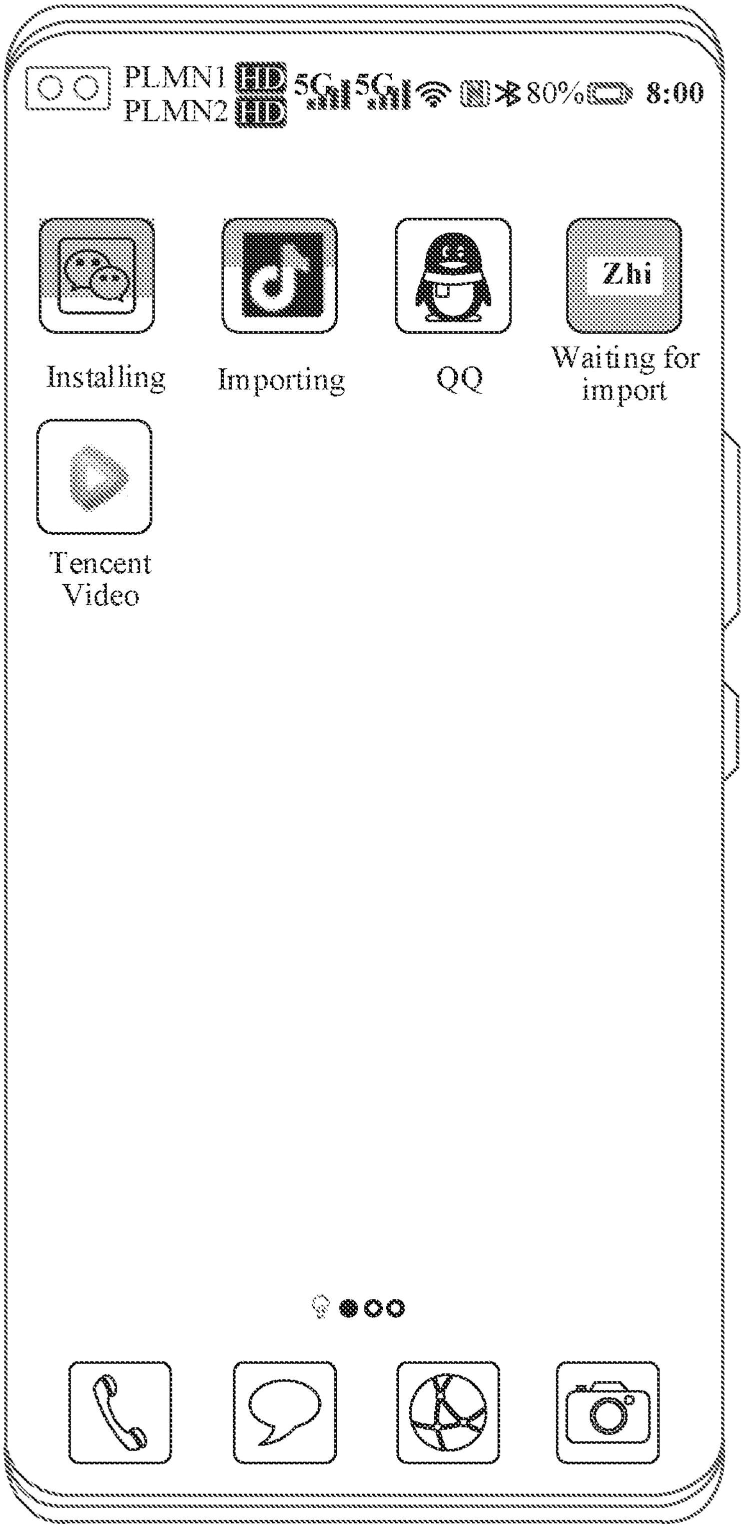

FIG. 3A and FIG. 3B are schematic diagrams of interfaces for entering a desktop according to an embodiment of this application. An example is used in which a terminal device is a mobile phone. As shown in an interface A in FIG. 3A, when using a cloning application to import data, the mobile phone can provide the user with an entrance to the desktop. For example, a control 01 is provided, and the control 01 is used to enter the desktop. In response to a user operation of tapping the control 01, the mobile phone displays the desktop as shown in the interface B in FIG. 3B. As can be seen, application icons of a plurality of applications are displayed in the interface B in FIG. 3B. Different applications may correspond to different icon statuses, and the icon status can indicate the import progress of the application.

It should be noted that when the mobile phone imports applications, icons of a plurality of applications to be imported are displayed on the desktop in the form of icon placeholders, and icons of applications at different import progresses display different icon statuses. Icon placeholder means that before the mobile phone imports the application, the icon of the application to be imported is pre-displayed in the layout position of the desktop. The user can see the specific position of the application to be imported on the desktop in advance and become familiar with the terminal device faster. It is conducive to improving the user experience.

In this embodiment of this application, the icon of the application may also be referred to as an application icon.

It should be noted that the icon status includes a waiting for import state, an installing state, an importing state, and an import completion state.

The waiting for import state indicates that the application is waiting for installation, the installing state indicates that the application package of the application is being installed, and the importing state indicates that the application data of the application is being imported.

It should be noted that the import progress of the application includes waiting for import, application installing, importing application data, and completed import. For an application, after import of application data of the application is completed, it means that the mobile phone has completed the import of the application.

When the import progress of the application is waiting for import, the corresponding icon status is the waiting for import state. For example, as shown in the interface B in FIG. 3B, the icon status of Zhihu® is the waiting for import state. Therefore, the current import progress of Zhihu® is waiting for import.

When the import progress of the application is application installation, the corresponding icon status is the installing state. For example, as shown in the interface B in FIG. 3B, the icon status of WeChat® is the installing state. Therefore, the current import progress of WeChat® is application installing.

When the import progress of the application is importing application data, the corresponding icon status is the importing state. For example, as shown in the interface B in FIG. 3B, the icon status of Douyin® is the importing state. Therefore, the current import progress of Douyin® is importing application data.

When the import progress of the application is completed import, the corresponding icon status is the import completion state. For example, as shown in the interface B in FIG. 3B, the icon status of Tencent Video® and QQ® is the import completion state. Therefore, the current import progress of Tencent Video® and QQ® is completed import.

It should be noted that when the mobile phone imports an application, the import progress in chronological order is waiting for import, application installing, importing application data, and completed import.

It should be noted that the icon status in this embodiment of this application includes brightness of the application icon and/or text display below the application icon. As can be seen from the interface B in FIG. 3B, the application icon whose icon status is the waiting for import state is all dark, and the text below the icon displays "Waiting for import": the application icon whose icon status is the installing state is partially lit, and the text below the icon displays "Installing": the application icon whose icon status is the importing state is also partially lit, and the text below the icon displays "Importing"; and the application icon whose icon status is the import completion state is all lit up, and the text below the icon is displayed as the name of the application, indicating that the application has been imported.

It should be understood that the lighting area of the application icon whose icon status is the importing state is larger than the lighting area of the application icon whose icon status is the installing state.

FIG. 4A to FIG. 4D are schematic diagrams of interfaces for refreshing an icon status according to an embodiment of this application. An example is used in which the first terminal device is a mobile phone and the mobile phone imports WeChat®. When the mobile phone starts to import WeChat®, the initial import progress is waiting for import. As shown in the interface A in FIG. 4A, the icon status of WeChat® is the waiting for import state.

Figures 4A, 4B:
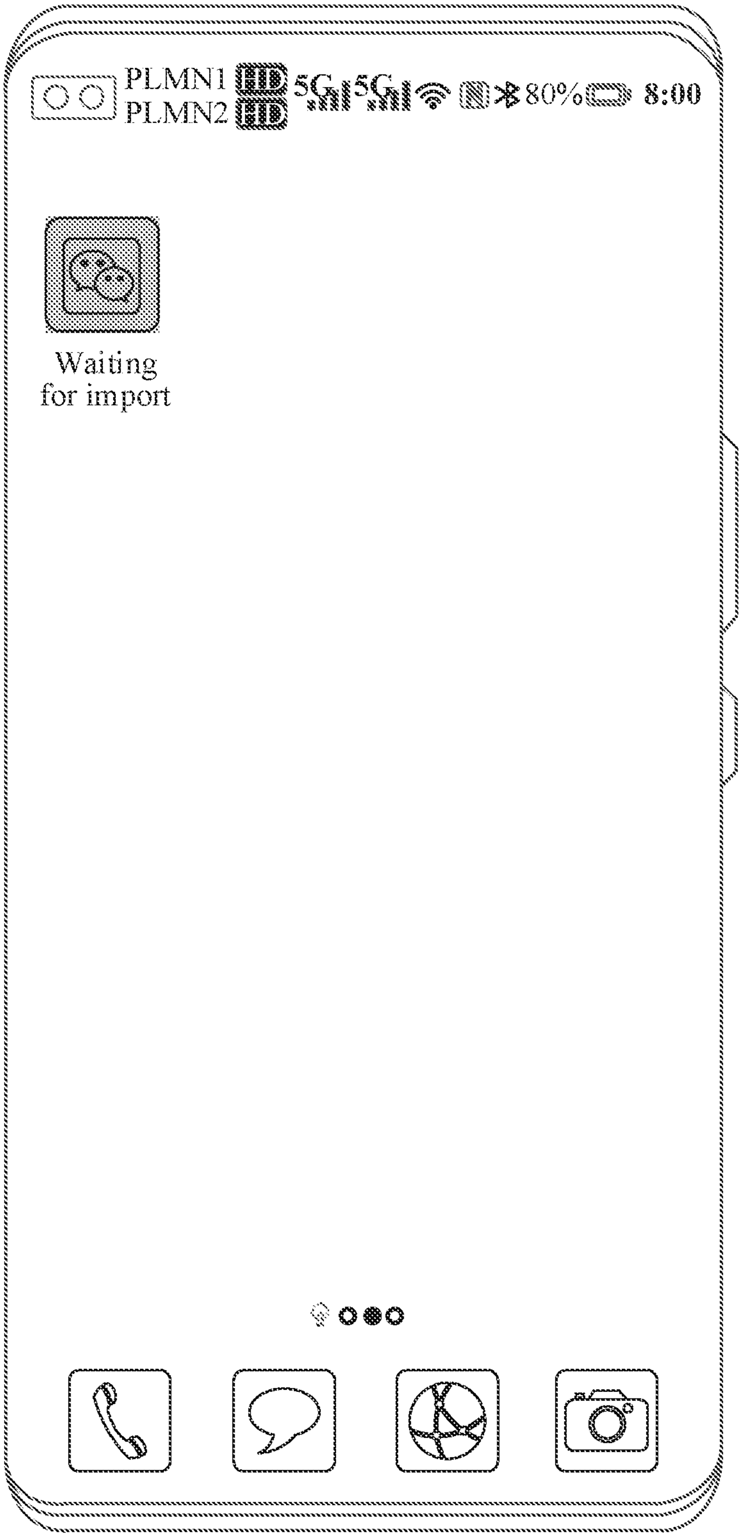
FIG. 4A to FIG. 4D are schematic diagrams of interfaces for refreshing an icon status according to an embodiment of this application.
Figure 4B:
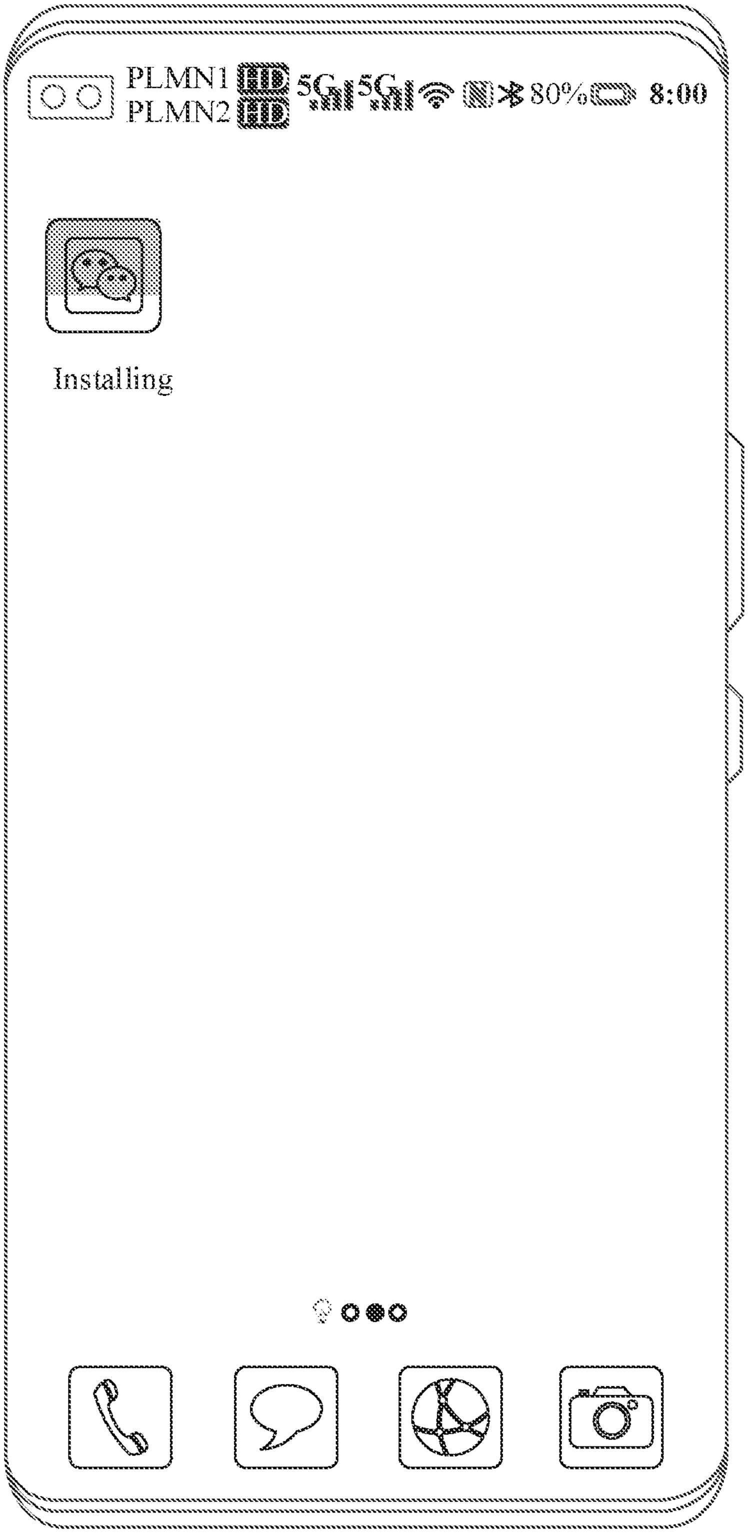

When the mobile phone starts to install WeChat®, as shown in the interface B in FIG. 4B, the mobile phone refreshes the icon status of WeChat® on the desktop from the waiting for import state to the installing state. When the icon status is the installing state, the WeChat® icon gradually lights up from all dark. The progress of the WeChat® icon lighting matches the progress of the WeChat® installation, and the text below the WeChat® icon displays "Installing".

Figure 4C:
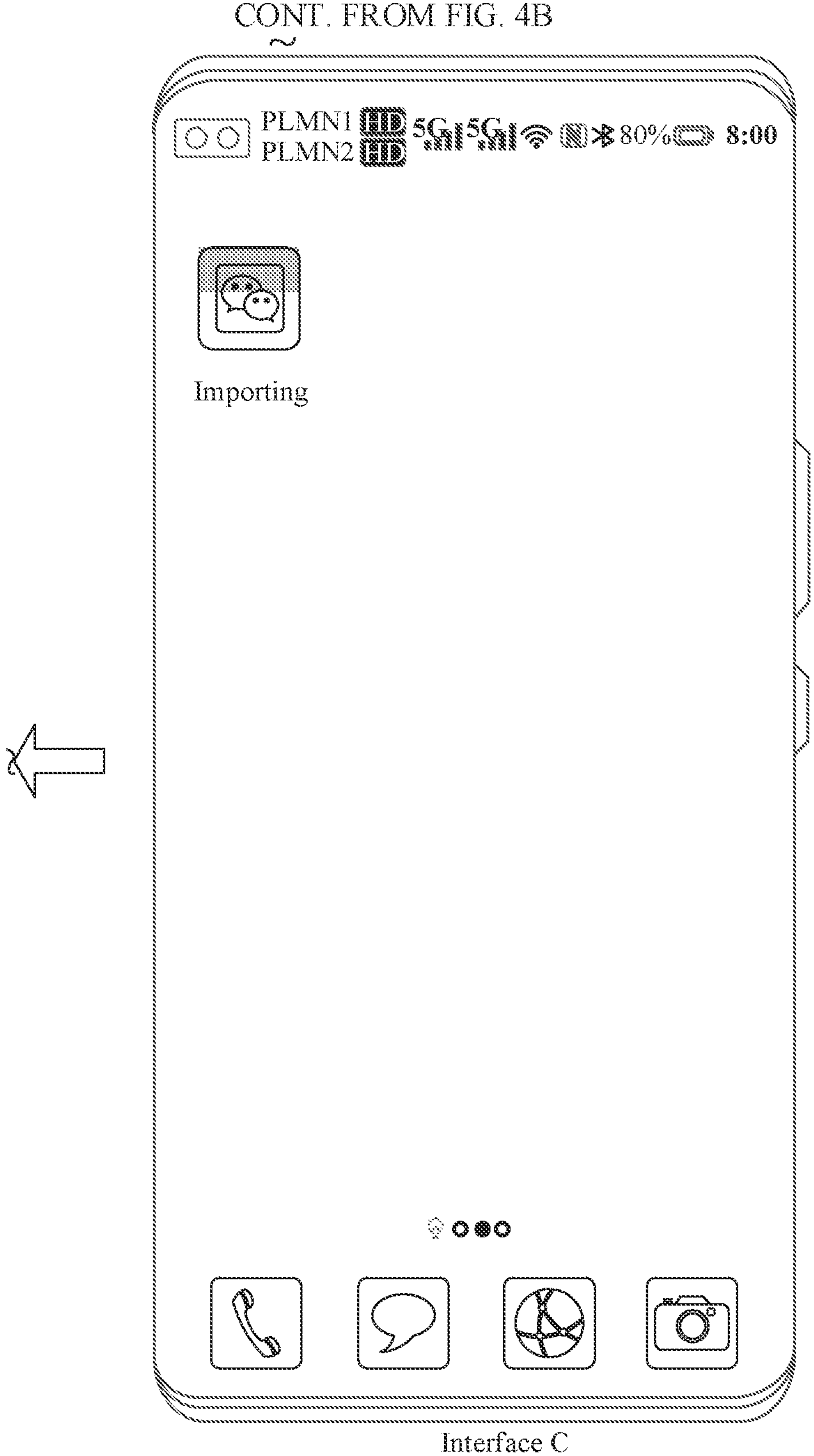

When the mobile phone starts to import the application data of WeChat®, as shown in the interface C in FIG. 4C, the mobile phone refreshes the icon status of WeChat® on the desktop from the installing state to the importing state. When the icon status is the importing state, more areas of the WeChat® icon are lit, and the text below the WeChat® icon displays "Importing".

Figures 4C, 4D:
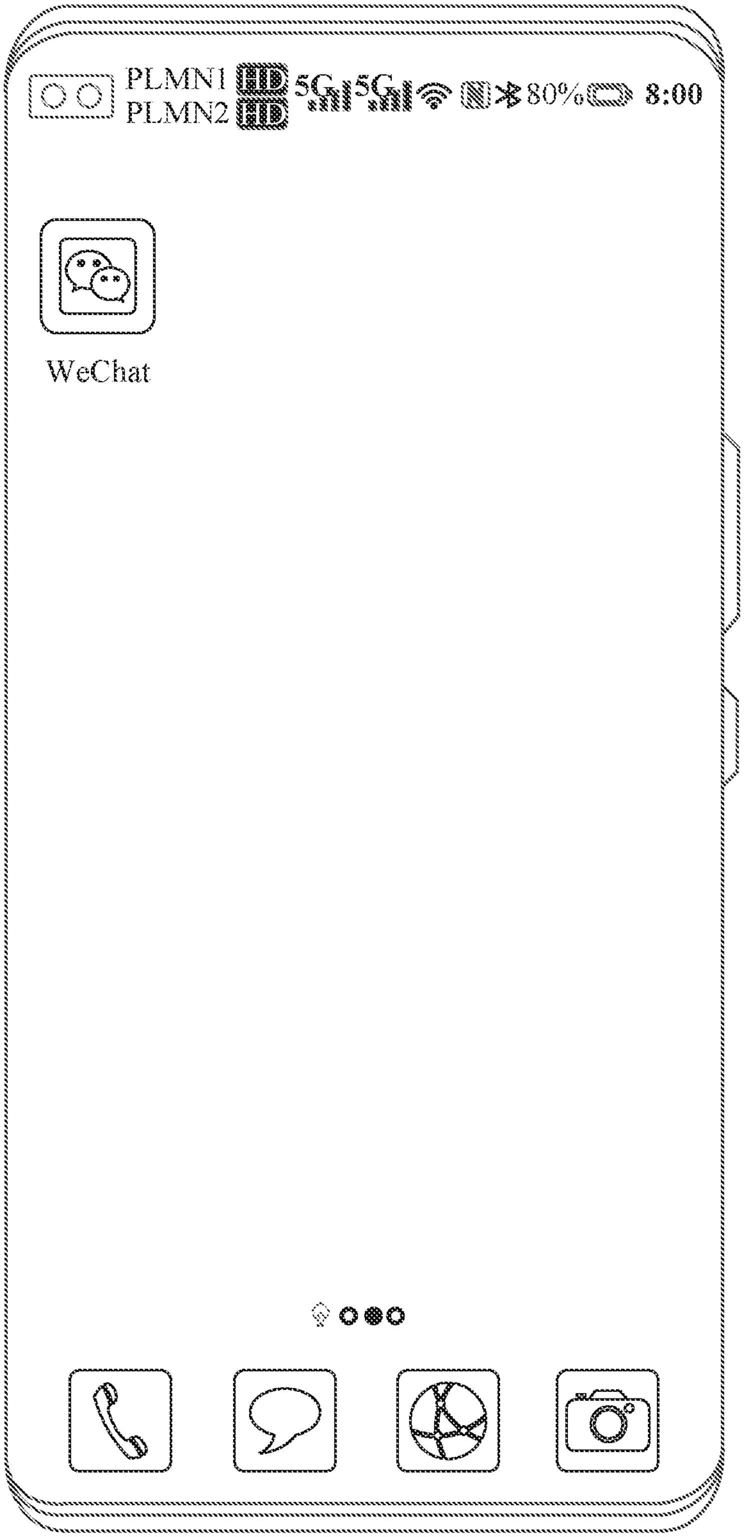

When the mobile phone completes the import of WeChat® application data, as shown in the interface D in FIG. 4D, the mobile phone refreshes the icon status of WeChat® on the desktop from the importing state to the import completion state. When the icon status is the import completion state, the WeChat® icon is all lit up, and the text below the WeChat® icon is displayed as "WeChat", which displays the name of the application.

Optionally, in the process of importing WeChat® to the mobile phone, the user can choose to pause the import of WeChat®. For example, the user can pause the import of WeChat® by tapping the WeChat® icon. For example, the user can tap the WeChat® icon again to continue importing WeChat®.

Figure 5:
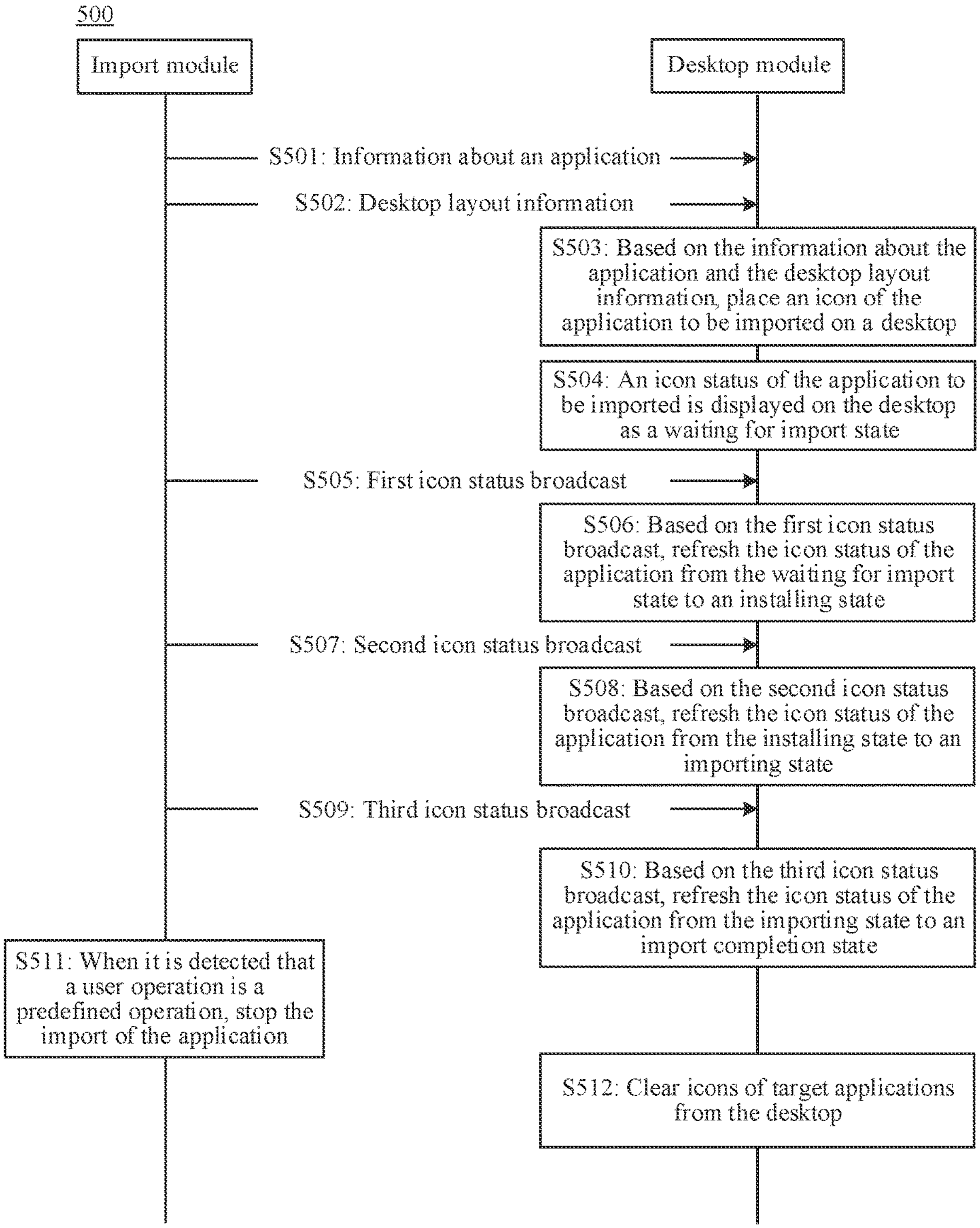
FIG. 5 is a schematic flowchart of an application icon display method according to an embodiment of this application.

The interface displaying different icon statuses is described above with reference to FIG. 3A and FIG. 3B and FIG. 4A to FIG. 4D. With reference to FIG. 5, the application icon display method according to embodiments of this application is described below.

As shown in FIG. 2, the first terminal device in this embodiment of this application may include an import module and a desktop module, where functions of the import module include: providing a list of applications to be imported and mapping data between applications and icons, installing applications and importing application data, refreshing notification icon statuses, performing heartbeat broadcasts of import processes, providing an abnormal icon fallback mechanism, and the like. The functions of the desktop module include: maintaining mapping data between applications and icons, realizing icon placement of application icons on the desktop, refreshing icon statuses, and the like.

FIG. 5 is a schematic flowchart of an application icon display method 500 according to an embodiment of this application. The steps of the method 500 are mainly executed interactively by the import module and the desktop module. The method 500 includes S501 to S512. The specific steps are as follows:

S501: The import module sends application information to the desktop module. Correspondingly, the desktop module receives the application information.

In this step, the application information includes a list of applications to be imported, application packages of the applications to be imported, and mapping data between applications and icons. The list of applications to be imported includes names of the applications to be imported, and the mapping data between applications and icons indicates an icon of each application to be imported.

It should be understood that after the data transmission is completed, the second terminal device may send indication information to the import module of the first terminal device, and the indication information indicates that all migration data has been sent. After receiving the indication information, the import module of the first terminal device triggers the import module to start data import, and then performs the steps of the method 500. Certainly, after receiving the indication information, the import module may further determine whether all the migration data has been received. When it is determined that all the migration data has been received, the import module is triggered to start data import.

S502: The import module sends desktop layout information to the desktop module. Correspondingly, the desktop module receives the desktop layout information.

In this step, the desktop layout information indicates positions of the icons of the applications to be imported on the desktop. In a data migration scenario, the second terminal device may send desktop layout information to the import module of the first terminal device, where the desktop layout information indicates layout positions of the icons of the applications to be imported on the desktop of the second terminal device.

For example, the layout position of the WeChat® icon on the second terminal device is the first row and first column of the first desktop page, the layout position of the Douyin® icon on the second terminal device is the first row and second column of the first desktop page, the layout position of the QQ® icon on the second terminal device is the first row and third column of the first desktop page, the layout position of the Zhihu® icon on the second terminal device is the first row and fourth column of the first desktop page, and the layout position of the Tencent Video® icon on the second terminal device is the second row and first column of the first desktop page.

S503: The desktop module places the icons of the applications to be imported on the desktop based on the application information and the desktop layout information.

In this step, the desktop module obtains the icons of the applications to be imported based on the application information, and places the icons of the applications to be imported on the desktop based on the desktop layout information. When the icons are placed, the icon status of the application to be imported is the waiting for import state, for example, the icon status of WeChat® shown in the interface A in FIG. 4A.

In this step, because the icon of the application can be placed according to the desktop layout information, it is more in line with the usage habits of the user, improving the user experience.

It should be understood that S502 is optional, that is, the desktop module does not know the layout position of the application to be imported on the desktop of the second terminal device. In this case, the desktop module places the icons of the applications to be imported on the desktop based on the application information. For example, the desktop module may place the icons of the applications to be imported on the desktop in alphabetical order of the applications to be imported.

S504: The desktop module displays the icon status of the applications to be imported on the desktop as the waiting for import state.

In this step, when the import module does not start the import process, the initial icon status of the application to be imported is the waiting for import state, for example, the icon status of WeChat® shown in the interface A in FIG. 4A.

It should be understood that there may be a plurality of applications to be imported. In conjunction with S505 to S510, refreshing of an application icon status is described below by using one of the plurality of applications to be imported as an example.

S505: When starting application installing, the import module sends a first icon status broadcast to the desktop module. Correspondingly, the desktop module receives the first icon status broadcast.

In this step, the first icon status broadcast indicates the desktop module to refresh the icon status of the application.

Optionally, the import module may indicate application identifiers and refreshed icon statuses through the first icon status broadcast, and the application identifiers are used by the desktop module to determine which application icon status to refresh.

It should be understood that the import module can call an interface of application installing to start application installing.

S506: Based on the first icon status broadcast, the desktop module refreshes the icon status of the application from the waiting for import state to the installing state. For example, after the import module starts to install WeChat®, the desktop module can refresh the icon status of WeChat® from the waiting for import state shown in the interface A in FIG. 4A to the installing state as shown in the interface B in FIG. 4B.

S507: When starting import of application data of the application, the import module sends a second icon status broadcast to the desktop module. Correspondingly, the desktop module receives the second icon status broadcast.

In this step, the second icon status broadcast indicates the desktop module to refresh the icon status of the application.

Optionally, the import module may indicate application identifiers and refreshed icon statuses through the second icon status broadcast, and the application identifiers are used by the desktop module to determine which application icon status to refresh.

It should be understood that after the application is installed, first feedback information may be sent to the import module, and the first feedback information indicates that the application installation is completed. When determining that the application installation is completed, the import module may call an interface for importing application data to start importing the application data of the application.

S508: Based on the second icon status broadcast, the desktop module refreshes the icon status of the application from the installing state to an importing state. For example, after the import module starts importing the application data of WeChat®, the desktop module can refresh the icon status of WeChat® from the installing state shown in the interface B in FIG. 4B to the importing state shown in the interface C in FIG. 4C.

S509: After completing the import, the import module sends a third icon status broadcast to the desktop module. Correspondingly, the desktop module receives the third icon status broadcast.

In this step, the third icon status broadcast indicates the desktop module to refresh the icon status of the application.

Optionally, the import module may indicate application identifiers and refreshed icon statuses through the third icon status broadcast, and the application identifiers are used by the desktop module to determine which application icon status to refresh.

S510: Based on the third icon status broadcast, the desktop module refreshes the icon status of the application from the importing state to an import completion state. For example, after the import module completes the import of the application data of WeChat®, the desktop module can refresh the icon status of WeChat® from the importing state shown in the interface C in FIG. 4C to the import completion state shown in the interface D in FIG. 4D.

Optionally, the method 500 further includes S511 and S512.

S511: When detecting that a user operation is a predefined operation, the import module stops the import of the application.

In this step, stopping the import of the application means stopping the import of the application whose import progress is waiting for import, being installed, or being imported.

During the interaction between the import module and the desktop module, the import module may send a heartbeat broadcast to the desktop module to indicate an online status of the import module. In the application import process, there may be exceptions in the import process. For example, the user accidentally clears a cloning application from the background. That is, the predefined operation includes an operation of clearing a cloning application. In this case, the import module stops importing the application, stops sending heartbeat broadcasts to the desktop module, and is offline.

In the application import process, the import process may be stopped. For example, the user cancels the import process, that is, the predefined operation includes an operation of canceling the import process. In this case, the import module may send a stop broadcast message to the desktop module, where the stop broadcast message indicates stopping the import of the application.

S512: The desktop module clears icons of target applications from the desktop.

In this step, the target applications include applications that have not been installed, and the applications that have not been installed include an application whose import progress is importing application data, and an application whose import progress is application installing.

It should be noted that an application whose import progress is importing application data and an application whose import progress is completed import have completed application installing. The user can normally use the application that has been installed, but the application that has not been installed cannot be used normally by the user. Therefore, the desktop module can clear icons of applications that have not been installed on the desktop, while retaining icons of applications that have been installed.

Optionally, when the import process is abnormal, because the import module stops sending heartbeat broadcasts, the desktop module can trigger a heartbeat broadcast timeout mechanism when determining that a length of time since the last heartbeat broadcast was received is greater than a preset threshold, and clear the icons of the target applications on the desktop.

Optionally, when the import process is stopped, the desktop module may determine that the import process is stopped after receiving the stop broadcast message, and clear the icons of the target applications on the desktop.

It should be noted that, when the import process is stopped, for example, the user can cancel import processes of all applications to be imported, or the user can cancel an import process of one of the applications to be imported. For the case of canceling the import processes of all applications to be imported, the desktop module can clear the icons of the target applications in all applications to be imported from the desktop. For the case of canceling an import process of one of the applications to be imported, if the application has not been installed, the desktop module cancels an icon of the application from the desktop; and if the application has been installed, the desktop module retains the icon of the application on the desktop.

It should be noted that when there are a plurality of applications to be imported, the import module can determine an import order of the applications to be imported according to a preset rule.

Optionally, the desktop module determines the import order of the applications to be imported according to usage frequencies of the applications to be imported.

Optionally, the import module determines the import order of the applications to be imported in alphabetical order of the applications to be imported.

In a possible implementation, the import module can start the import of another application after the import of one application is completed according to a preset installation sequence. The import order of the applications to be imported is determined in alphabetical order of the applications to be imported. For example, the applications to be imported include Douyin®, Tencent Video®, WeChat® and Zhihu®. The first letter of Douyin® is "D", the first letter of Tencent Video® is "T", the first letter of WeChat® is "W", and the first letter of Zhihu® is "Z". Therefore, the import module first installs Douyin®. After Douyin® is installed, import of application data of Douyin® is started. After the application data of Douyin® is imported, the import module completes the import of Douyin®. After that, the import module starts to install Tencent Video® according to the import order. After Tencent Video® is installed, import of application data of Tencent Video® is started. After the application data of Tencent Video® is imported, the import module completes the import of Tencent Video®. In the same way, the desktop module then completes the import of WeChat® and Zhihu® according to the import order.

In another possible implementation, the import module can install a plurality of applications at the same time and import the application data of the applications serially.

The import order of the applications to be imported is determined in alphabetical order of the applications to be imported. For example, the applications to be imported include Douyin®, Tencent Video®, WeChat® and Zhihu®. The import module can install Douyin®, Tencent Video®, WeChat® and Zhihu® at the same time. After Douyin® is installed, the import module first starts to import the application data of Douyin®. After the application data of Douyin is imported and Tencent Video® is installed, import of the application data of Tencent Video® is started. After WeChat® is installed, import of the application data of WeChat® is started. After the application data of WeChat® is imported and Zhihu® is installed, import of the application data of Zhihu® is started.

Optionally, the foregoing desktop layout information may include card layout information. The card layout information indicates which application cards are added to the desktop and layout positions of the added cards.

In a possible implementation, the desktop module can add application cards to the desktop layout after all applications to be imported are imported.

In another possible implementation, the desktop module can detect, after an application is imported, whether the card layout information indicates adding a card for the application. If so, the desktop module adds the card for the application on the desktop.

In another possible implementation, the desktop module can, as described in S503, place the card in advance at the corresponding layout position for the application indicated in the card layout information when placing icons on the desktop, and can prompt the user to wait for the application card to be added at this layout position.

With reference to FIG. 5, the process of refreshing the icon status from the waiting for installation status to the installing state, from the installing state to the importing state, and from the importing state to the import completion state is described above. In some scenarios, the icon status may not be refreshed exactly in the order described in FIG. 5. The following describes a refresh sequence of icons in various possible scenarios with reference to FIG. 6.

Figure 6:
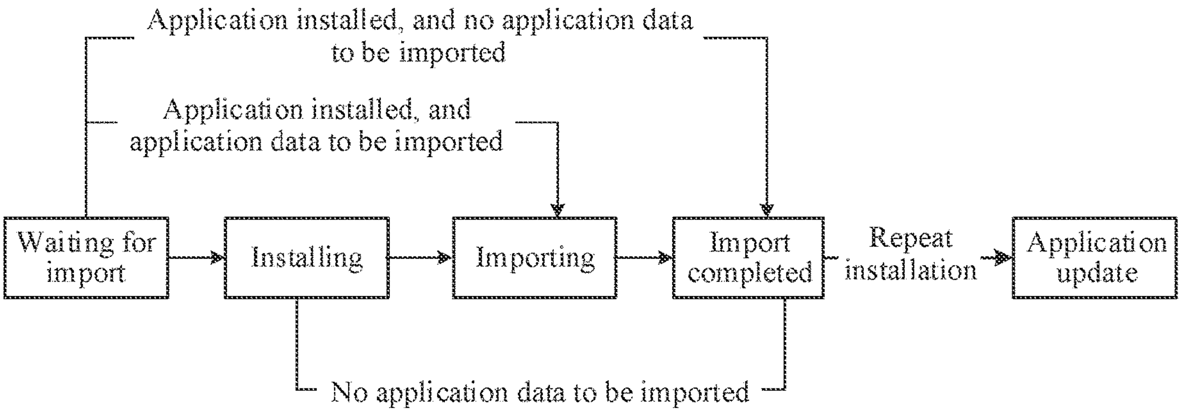
FIG. 6 is a schematic diagram of icon status refresh according to an embodiment of this application.

FIG. 6 is a schematic diagram of icon status refresh according to an embodiment of this application. As shown in FIG. 6, by using import of one application in a plurality of applications to be imported as an example, an initial icon status of the application is the waiting for import state.

Optionally, before starting to install the application, the import module can detect whether the application has been installed in the system and whether there is application data for the application.

In a possible scenario, after the first terminal device enters the desktop, the user may have installed the application in the first terminal device in another manner, such as installing the application through an application mall, a browser, or the like (provided that the application mall and the browser have been installed in the first terminal device).

When the application has been installed in the first terminal device and the application has no application data, after detecting that the application has been installed, the import module sends a fourth icon status broadcast to the desktop module, indicating through the fourth icon status broadcast that the refreshed icon status of the application is the import completion state. Based on the fourth icon status broadcast, the desktop module refreshes the icon status of the application on the desktop from the waiting for import state to the import completion state.

When the application has been installed in the first terminal device and the application has application data, after detecting that the application has been installed, the import module sends a fifth icon status broadcast to the desktop module, and indicates through the fifth icon status broadcast that the refreshed icon status of the application is the importing state. Based on the fifth icon status broadcast, the desktop module refreshes the icon status of the application on the desktop from the waiting for import state to the importing state.

In another possible scenario, the application is not installed in the first terminal device.

When the application is not installed in the first terminal device, the import module can start installing the application and send a sixth icon status broadcast to the desktop module, indicating through the sixth icon status broadcast that the refreshed icon status of the application is the installing state. Based on the sixth icon status broadcast, the desktop module refreshes the icon status of the application on the desktop from the waiting for import state to the installing state.

After the import module installs the application and determines that the application has no application data, the import module sends a seventh icon status broadcast to the desktop module, indicating through the seventh icon status broadcast that the refreshed icon status of the application is the import completion state. Based on the seventh icon status broadcast, the desktop module refreshes the icon status of the application on the desktop from the installing state to the import completion state.

After the import module installs the application and determines that the application has application data, the import module sends an eighth icon status broadcast to the desktop module, indicating through the eighth icon status broadcast that the refreshed icon status of the application is the importing state. Based on the eighth icon status broadcast, the desktop module refreshes the icon status of the application on the desktop from the installing state to the importing state.

After the import module imports the application, the import module sends a ninth icon status broadcast to the desktop module, indicating through the ninth icon status broadcast that the refreshed icon status of the application is the import completion state. Based on the ninth icon status broadcast, the desktop module refreshes the icon status of the application on the desktop from the importing state to the import completion state.

In the application import process, there may be situations that affect importing application data. In a possible scenario, an example is used in which the import module has WeChat® version 7.0 installed and is importing WeChat® application data. During the process of importing WeChat® application data, a BMS in an application framework layer can call an AMS interface, causing the AMS to refresh a status flag bit, for example, refresh the status flag bit from “0” to “1”, where the status flag bit being “1” indicates that the application data is being imported. If the user expects to download the latest WeChat® 8.0 version in the application mall in this case, when the application mall receives a request to download the WeChat® 8.0 version, because the PMS is responsible for the installation of the application, the application mall can send an installation instruction to the PMS. After receiving the installation instruction, the PMS sends a query instruction to the AMS, where the query instruction is used to query the status flag bit. The PMS obtains the status flag bit to determine that the import module is importing the WeChat® application. Therefore, PMS can return an instruction indicating installation failure to the application mall. The application mall can prompt the user on the download page that WeChat® version 8.0 is currently unable to be installed.

Optionally, as shown in FIG. 6, the import module can reinstall WeChat® version 8.0 after completing the import of WeChat® application data. In this case, the icon status further includes an application update state, and the desktop module can refresh the icon status of WeChat® from the import completion state to the application update state on the desktop.

Through the foregoing protection mechanism, the first terminal device can protect the process of importing application data, avoiding the process of downloading the latest WeChat® 8.0 version from affecting the current process of importing application data, and improving the reliability of data transmission.

In the foregoing description, as shown in FIG. 3, the first terminal device can provide the user with an entrance to the desktop (for example, the control 01 shown in the interface A in FIG. 3A) in the data import process. Optionally, the first terminal device may further provide the user with an entrance to the desktop in the data transmission process.

Figure 7A:
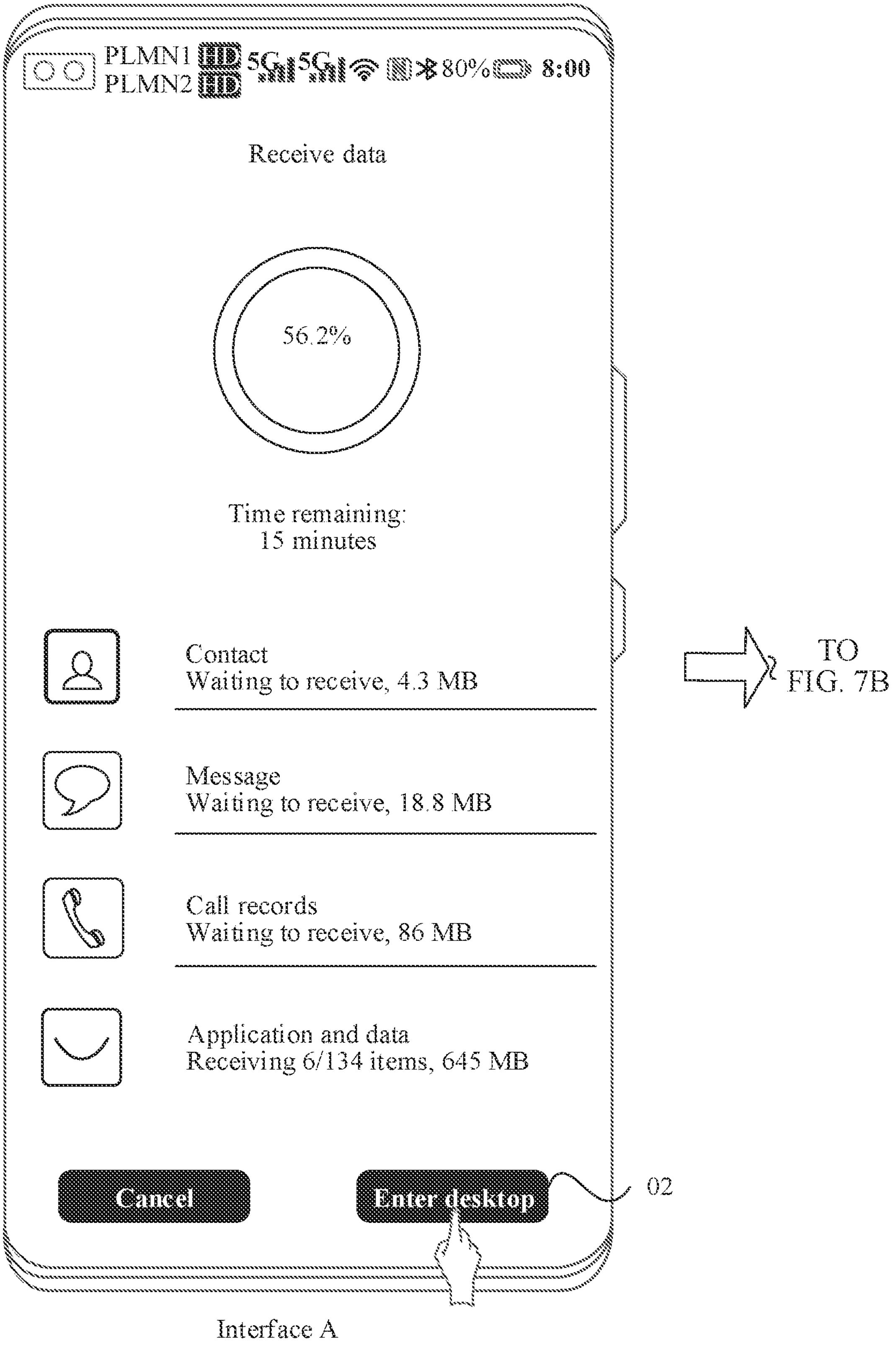
FIG. 7A and FIG. 7B are schematic diagrams of another interface for entering a desktop according to an embodiment of this application.
Figure 7B:
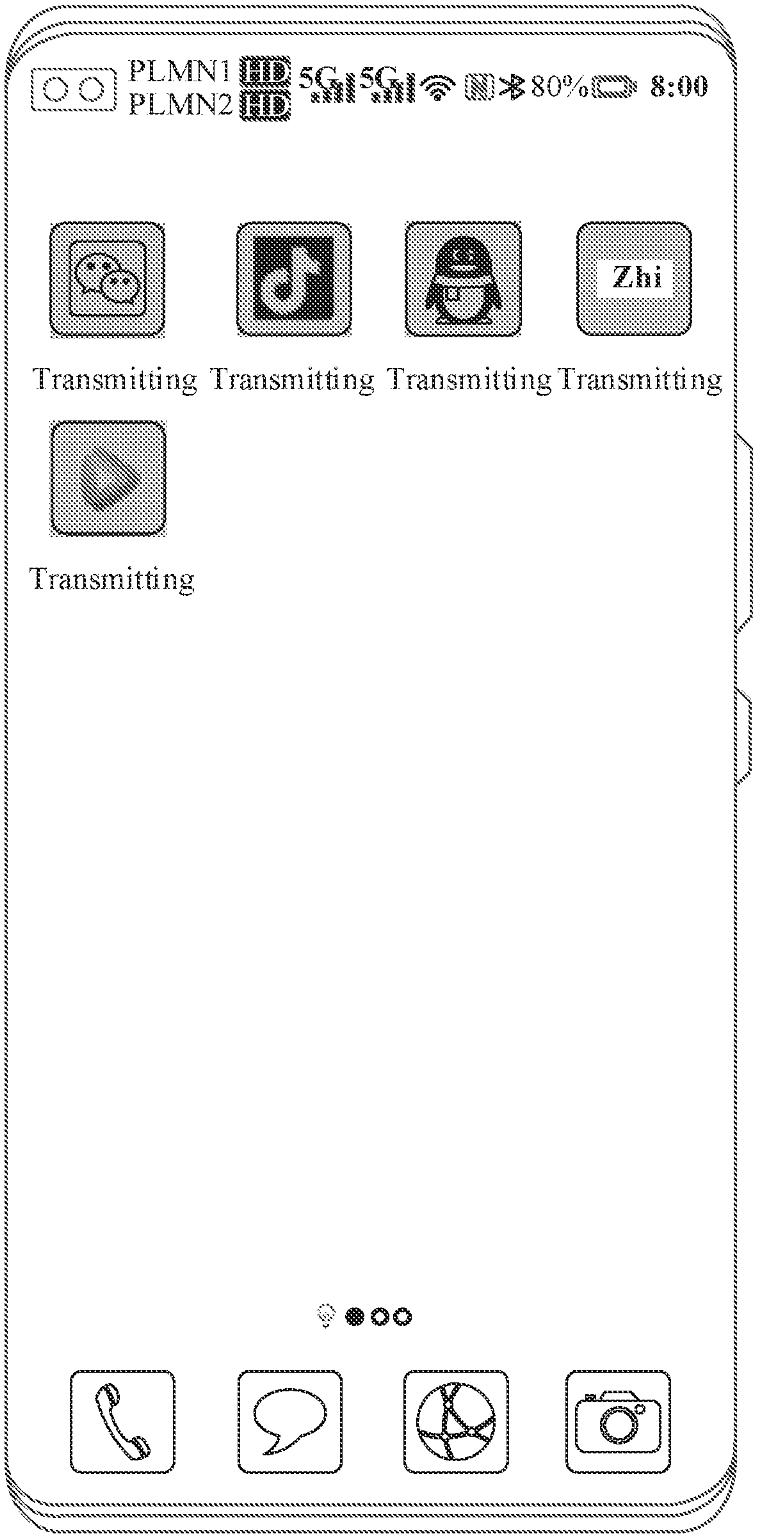

FIG. 7A and FIG. 7B are schematic diagrams of another interface for entering a desktop according to an embodiment of this application. An example is used in which the first terminal device is a mobile phone, as shown in an interface A in FIG. 7A, when using a cloning application to transmit data, the mobile phone can display an interface for receiving data, and provide the user with an entrance to the desktop. For example, a control 02 is provided, and the control 02 is used to enter the desktop. In response to a user operation of tapping the control 02, the mobile phone displays the desktop as shown in the interface B in FIG. 7B. As can be seen, application icons of a plurality of applications are displayed in the interface B in FIG. 7B. Because the mobile phone is still in the data transmission stage and has not yet installed applications and imported application data, the displayed icon statuses of the plurality of applications to be imported are all the transmitting state, which corresponds to the data transmission stage of data migration.

It should be noted that for the new mobile phone and the old mobile phone in the data migration scenario, the new mobile phone and the old mobile phone establish a connection, and before starting the data transmission, the new mobile phone can indicate the old mobile phone to first transmit application information and desktop layout information. After receiving the application information and the desktop layout information, the new mobile phone can place icons on the desktop according to the application information and the desktop layout information. In this way, in response to the user operation of tapping the control 02, the new mobile phone can display a desktop as shown in the interface B in FIG. 7B.

Figure 8:
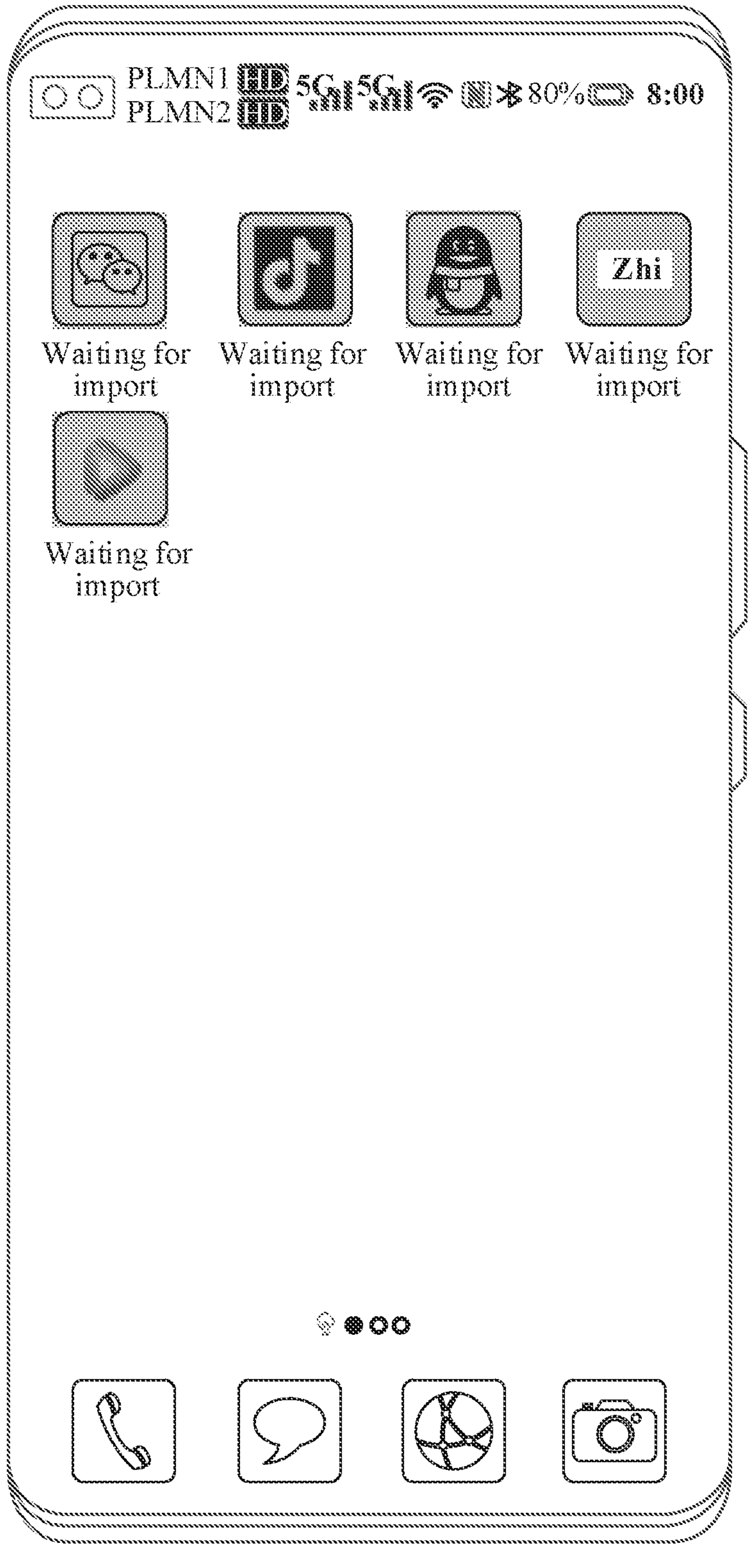
FIG. 8 is a schematic diagram of an interface for displaying an icon status according to an embodiment of this application.

FIG. 8 is a schematic diagram of an interface for displaying an icon status according to an embodiment of this application. As shown in FIG. 8, after the data transmission is completed, the mobile phone enters the data import stage. The mobile phone refreshes the icon statuses of the plurality of applications to be imported from the transmitting state to the waiting for import state. After that, according to the application installation and application data import, icon statuses of the applications are refreshed on the desktop. For the description of refreshing the icon status in the data import stage, refer to the description above. Details are not described herein again.

Similar to the implementation of refreshing the icon status in the data import stage, after detecting the end of data transmission, the import module can send a tenth icon status broadcast to the desktop module, indicating through the first icon status broadcast to refresh the icon statuses of all applications on the desktop to the waiting for import state. Based on the tenth icon status broadcast, the desktop module refreshes the icon statuses of all applications on the desktop from the transmitting state to the waiting for import state.

As shown in the interface B in FIG. 7B, the application icon whose icon status is the transmitting state is all dark. Because the application icon whose icon status is the waiting for import state is also all dark, the two icons can be distinguished by the text displayed below the icons. As shown in the interface B in FIG. 3B, the text displayed below the application icon whose icon status is the waiting for import state is "Waiting for import". As shown in the interface B in FIG. 7B, the text displayed below the application icon whose icon status is the transmitting state is "Transmitting".

In addition, when refreshing the icon status from the transmitting state to the waiting for import state, the color of the application icon can be refreshed to distinguish between the transmitting state and the waiting for import state through different colors.

It should be understood that, sequence numbers of the foregoing processes do not mean a sequence of execution. The execution sequence of the processes should be determined based on functions and internal logic of the processes, and should not constitute any limitation on an implementation process of embodiments of this application.

The application icon display method according to embodiments of this application is described in detail above with reference to FIG. 1 to FIG. 8. Next, an application icon display apparatus according to embodiments of this application is described in detail below with reference to FIG. 9 and FIG. 10.

Figure 9:
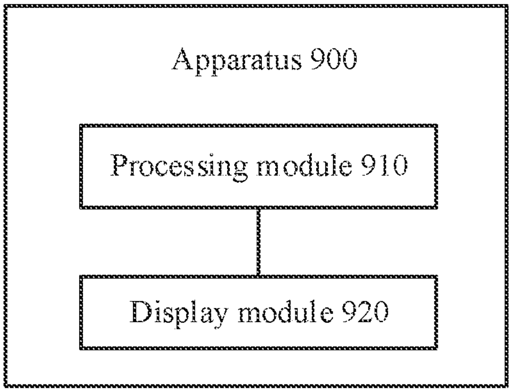
FIG. 9 is a schematic block diagram of an application icon display apparatus according to an embodiment of this application.

FIG. 9 is a schematic block diagram of an application icon display apparatus 900 according to an embodiment of this application. The apparatus 900 includes: a processing module 910 and a display module 920.

The processing module 910 is configured to establish a connection to a second terminal device. The display module 920 is configured to display a first interface when migration data sent by the second terminal device is received, where the first interface includes one or more of a data volume, a transmission progress, or transmission time of the migration data. The processing module 910 is further configured to start to import the migration data in a case that the migration data is received. The display module 920 is further configured to display a second interface in a process of importing the migration data, where the second interface includes a first control; and display a first desktop in response to a user operation of selecting the first control, where the first desktop includes a first icon of a first application and a first import progress of the first application, and an icon status of the first application is a first status. The processing module 910 is further configured to update the icon status of the first application to a second status on the first desktop when the import progress of the first application changes, where the second status includes a second icon of the first application and a second import progress.

For the first interface, refer to an interface A in FIG. 7A. For the second interface, refer to an interface A in FIG. 3A. The first control can correspond to a control 01. For the first desktop, refer to a desktop shown in an interface B in FIG. 3B. For the first application, refer to Zhihu®, WeChat® or Douyin® shown in the interface B in FIG. 3B. When the first application is Zhihu®, the first status is waiting for import. When the first application is WeChat®, the first status is installing. When the first application is Douyin®, the first status is importing.

As shown in the interface B in FIG. 3B, the desktop displays icons of applications and text below the icons. The text below the icon describes an import progress of the application. Different icon statuses include different icons and import progresses.

Optionally, the first status includes a waiting for import state. The processing module 910 is configured to update the icon status of the first application to an installing state on the first desktop when the import progress of the first application changes from waiting for import to application installing.

Optionally, the first status includes a waiting for import state. The processing module 910 is configured to update the icon status of the first application to an importing state on the first desktop when the import progress of the first application changes from waiting for import to importing application data.

Optionally, the first status includes a waiting for import state. The processing module 910 is configured to update the icon status of the first application to an import completion state on the first desktop when the import progress of the first application changes from waiting for import to completed import.

Optionally, the first status includes an installing state. The processing module 910 is configured to update the icon status of the first application to an importing state on the first desktop when the import progress of the first application changes from application installing to importing application data.

Optionally, the first status includes an installing state. The processing module 910 is configured to update the icon status of the first application to an import completion state on the first desktop when the import progress of the first application changes from application installing to completed import.

Optionally, the first status includes an importing state. The processing module 910 is configured to update the icon status of the first application to an import completion state on the first desktop when the import progress of the first application changes from importing application data to completed import.

Optionally, the processing module 910 includes an import module and a desktop module, where the import module is configured to: detect the import progress of the first application; and when detecting a change in the import progress, send a first broadcast to the desktop module, where the first broadcast indicates to update the icon status of the first application. The desktop module is configured to receive the first broadcast; and update the icon status of the first application to the second status on the first desktop based on the first broadcast.

The first broadcast may correspond to the icon status broadcast described in the foregoing embodiment.

Optionally, the processing module 910 includes an import module and a desktop module, where the import module is configured to send first indication information to the desktop module, where the first indication information indicates a position of the icon of the first application on the first desktop. The desktop module is configured to receive the first indication information, and place the icon of the first application on the first desktop based on the first indication information.

The first indication information may correspond to the desktop layout information described in the foregoing embodiment.

Optionally, the processing module 910 is configured to clear icons of target applications from the first desktop in a case of detecting that a user operation is a predefined operation, where the target applications include applications that have not been installed.

Optionally, the apparatus 900 further includes a transceiver module, configured to receive second indication information from the second terminal device, where the second indication information indicates that all the migration data has been sent. The processing module 910 is configured to start to import the migration data in a case of determining based on the second indication information that the migration data has been received.

In an optional example, a person skilled in the art can understand that the apparatus 900 may be specifically the first terminal device in the foregoing embodiment, or the functions of the first terminal device in the foregoing embodiment may be integrated into the apparatus 900. The function may be implemented by hardware, or may be implemented by executing corresponding software by hardware. The hardware or the software includes one or more modules corresponding to the foregoing function. The apparatus 900 may be configured to perform the processes and/or operations corresponding to the first terminal device in the foregoing method embodiment.

It should be understood that the apparatus 900 herein is embodied in the form of a functional module. The term "module" as used herein may refer to an application specific integrated circuit (ASIC), an electronic circuit, a processor (such as a shared processor, a proprietary processor, or a group of processors) used to execute one or more software or firmware programs and a memory, an incorporated logic circuit, and/or other suitable components supporting the described functions. In this embodiment of this application, the apparatus 900 in FIG. 9 may alternatively be a chip or a chip system, such as a system on chip (SoC).

Figure 10:
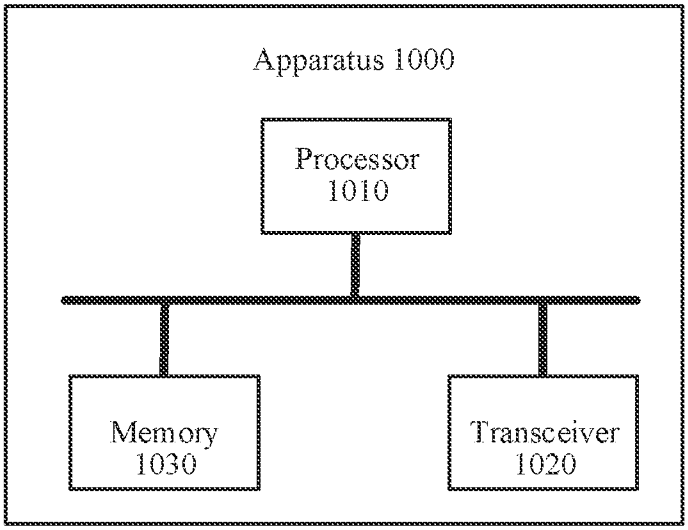
FIG. 10 is a schematic block diagram of another application icon display apparatus according to an embodiment of this application.

FIG. 10 is a schematic block diagram of another application icon display apparatus 1000 according to an embodiment of this application. The apparatus 1000 may include a processor 1010, a transceiver 1020, and a memory 1030. The processor 1010, the transceiver 1020 and the memory 1030 communicate with each other through an internal connection path. The memory 1030 is configured to store instructions. The processor 1010 is configured to execute the instructions stored in the memory 1030 to control the transceiver 1020 to send signals and/or receive signals.

It should be noted that the apparatus 1000 may be configured to perform the steps and/or processes corresponding to the first terminal device in the foregoing method embodiments. Optionally, the memory 1030 may include a read-only memory and a random access memory, and provide instructions and data for the processor. A part of the memory may further include a nonvolatile random access memory. For example, the memory may further store information of a device type. The processor 1010 can be used to execute instructions stored in the memory, and when the processor executes the instructions, the processor can execute various steps and/or processes corresponding to the first terminal device in the foregoing method embodiments.

It should be understood that in this embodiment of this application, the processor 1010 may be a central processing unit (CPU), or may be another general-purpose processor, a digital signal processor (DSP), an application specific integrated circuit (ASIC), a field-programmable gate array (FPGA) or another programmable logic device, a discrete gate or a transistor logic device, a discrete hardware component, or the like. The general purpose processor may be a microprocessor, or the processor may be any conventional processor or the like.

This application further provides a computer-readable storage medium, storing computer executable instructions, where the computer executable instructions, when executed by a processor, can implement the method performed by the first terminal device in any method embodiment above.

An embodiment of this application further provides a computer program product, including a computer program. When the computer program is executed by a processor, the method performed by the first terminal device in any method embodiment above can be implemented.

In an implementation process, steps in the foregoing methods can be implemented by using a hardware integrated logical circuit in the processor, or by using instructions in a form of software. The steps of the method disclosed with reference to embodiments of this application may be directly performed by a hardware processor, or may be performed by using a combination of hardware in the processor and a software module. A software module may be located in a mature storage medium in the art, such as a random access memory, a flash memory, a read-only memory, a programmable read-only memory, an electrically erasable programmable memory, or a register. The storage medium is located in the memory, and the processor executes the instructions in the memory and completes the steps in the foregoing method in combination with hardware of the processor. To avoid repetition, details are not described herein again.

A person of ordinary skill in the art may be aware that the example modules and algorithm steps described with reference to embodiments disclosed in this specification can be implemented by using electronic hardware or a combination of computer software and electronic hardware. Whether a function is performed by hardware or by software depends on particular applications and design constraints of the technical solutions. A person skilled in the art may use different methods to implement the described functions for each specific application, but it should not be considered that the implementation goes beyond the scope of this application.

A person skilled in the art may clearly understand that, for simple and clear description, for specific work processes of the foregoing described system, apparatus, and module, refer to corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the module division is merely logical function division and may be other division during actual implementation. For example, a plurality of modules or components may be combined or integrated into another system, or some features may be ignored or not performed. In addition, the displayed or discussed mutual couplings or direct couplings or communication connections may be implemented by using some interfaces. The indirect couplings or communication connections between the apparatuses or modules may be implemented in electronic, mechanical, or other forms.

The modules described as separate parts may or may not be physically separate, and parts displayed as modules may or may not be physical modules, may be located in one position, or may be distributed on a plurality of network modules. Some or all of the modules may be selected according to actual needs to achieve the objectives of the solutions of the embodiments.

In addition, functional modules in embodiments of this application may be integrated into one processing module, or each module may exist alone physically, or two or more modules may be integrated into one module.

When the functions are implemented in the form of a software functional module and sold or used as an independent product, the functions may be stored in a computer-readable storage medium. Based on such an understanding, the technical solutions of this application essentially, or the part contributing to a conventional technology, or some of the technical solutions may be implemented in the form of a software product. The computer software product is stored in a storage medium, and includes several instructions for instructing a computer device (which may be a personal computer, a server, or a network device) to perform all or some of the steps of the methods described in embodiments of this application. The foregoing storage medium includes any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of embodiments of this application. Any variation or replacement readily figured out by a person skilled in the art within the technical scope disclosed in embodiments of this application shall fall within the protection scope of embodiments of this application. Therefore, the protection scope of embodiments of this application shall be subject to the protection scope of the claims.

What is claimed is:

1. An application icon display method, comprising:

establishing, by a first terminal device, a connection to a second terminal device;

displaying, by the first terminal device, a first interface based on the first terminal device receiving migration data from the second terminal device, wherein the first interface comprises one or more of a data volume, a transmission progress, or a transmission time of the migration data;

starting, by the first terminal device, to import the migration data in a case that the first terminal device has finished receiving the migration data;

displaying, by the first terminal device, a second interface in a process in which the first terminal device imports the migration data, wherein the second interface comprises a first control;

displaying, by the first terminal device, a first desktop in response to a user operation of selecting the first control, wherein the first desktop comprises a first icon of a first application and a first import progress of the first application, wherein an icon status of the first application is a first status, wherein the first status comprises an installing state, and wherein the installing state is a state of installing the first application; and updating, by the first terminal device, the icon status of the first application to a second status on the first desktop based on a change of the import progress of the first application, wherein the second status comprises a second icon of the first application and a second import progress, wherein the second status comprises an importing state, wherein the importing state is a state of importing application data to the first application after the first application is installed, wherein the application data comprises user-specific data for the first application included in the migration data from the second terminal device.

2. The method according to claim 1, wherein a third status comprises a waiting for import state, and wherein the method further comprises:

updating, by the first terminal device, the icon status of the first application from the third status to the first status on the first desktop, which comprises:

updating, by the first terminal device, the icon status of the first application to the installing state on the first desktop based on the import progress of the first application changing from waiting for import to application installing.

3. The method according to claim 1, further comprising:

updating, by the first terminal device, the icon status of the first application from the second status to a third status on the first desktop, wherein the third status comprises a completed import state, wherein the completed import state is a state after the importing of the application data to the first application is completed.

4. The method according to claim 1, wherein the updating, by the first terminal device, the icon status of the first application to the second status on the first desktop comprises:

detecting, by the first terminal device, the import progress of the first application;

sending, by the first terminal device, a first broadcast based on detecting a change in the import progress, wherein the first broadcast indicates to update the icon status of the first application; and updating, by the first terminal device, the icon status of the first application to the second status on the first desktop based on the first broadcast.

5. The method according to claim 4, further comprising:

sending, by the first terminal device, first indication information, wherein the first indication information indicates a position of the icon of the first application on the first desktop;

receiving, by the first terminal device, the first indication information; and placing, by the first terminal device, the icon of the first application on the first desktop based on the first indication information.

6. The method according to claim 1, further comprising:

clearing, by the first terminal device, icons of target applications from the first desktop in a case of detecting that a user operation is a predefined operation, wherein the target applications comprise applications that have not been installed.

7. The method according to claim 1, wherein the starting, by the first terminal device, to import the migration data in the case that the first terminal device has finished receiving the migration data comprises:

receiving, by the first terminal device, second indication information from the second terminal device, wherein the second indication information indicates that all the migration data has been sent; and starting, by the first terminal device, to import the migration data in a case of determining based on the second indication information that the migration data has been received.

8. A terminal device, comprising:

a processor; and a memory, wherein the memory is configured to store a computer program, and the processor is configured to execute the computer program to cause the terminal device to perform operations comprising:

establishing a connection to another terminal device;

displaying a first interface based on the terminal device receiving migration data from the another terminal device, wherein the first interface comprises one or more of a data volume, a transmission progress, or a transmission time of the migration data;

starting to import the migration data in a case that the terminal device has finished receiving the migration data;

displaying a second interface in a process in which the terminal device imports the migration data, wherein the second interface comprises a first control;

displaying a first desktop in response to a user operation of selecting the first control, wherein the first desktop comprises a first icon of a first application and a first import progress of the first application, wherein an icon status of the first application is a first status, wherein the first status comprises an installing state, and wherein the installing state is a state of installing the first application; and updating the icon status of the first application to a second status on the first desktop based on a change of the import progress of the first application, wherein the second status comprises a second icon of the first application and a second import progress, wherein the second status comprises an importing state, wherein the importing state is a state of importing application data to the first application after the first application is installed, wherein the application data comprises user-specific data for the first application included in the migration data from the another terminal device.

9. The terminal device according to claim 8, wherein a third status comprises a waiting for import state, and wherein the operations further comprise:

updating the icon status of the first application from the third status to the first status on the first desktop, which comprises:

updating the icon status of the first application to the installing state on the first desktop based on the import progress of the first application changing from waiting for import to application installing.

10. The terminal device according to claim 8, wherein the operations further comprise:

updating the icon status of the first application from the second status to a third status on the first desktop, wherein the third status comprises a completed import state, wherein the completed import state is a state after the importing of the application data to the first application is completed.

11. The terminal device according to claim 8, wherein the updating, the icon status of the first application to the second status on the first desktop comprises:

detecting the import progress of the first application;

sending a first broadcast based on detecting a change in the import progress, wherein the first broadcast indicates to update the icon status of the first application;

receiving the first broadcast; and updating the icon status of the first application to the second status on the first desktop based on the first broadcast.

12. The terminal device according to claim 11, wherein the processor is further configured to execute the computer program to cause the terminal device to perform operations comprising:

sending, first indication information, wherein the first indication information indicates a position of the icon of the first application on the first desktop;

receiving, the first indication information; and placing, the icon of the first application on the first desktop based on the first indication information.

13. The terminal device according to claim 8, wherein the processor is further configured to execute the computer program to cause the terminal device to perform operations comprising:

clearing icons of target applications from the first desktop in a case of detecting that a user operation is a predefined operation, wherein the target applications comprise applications that have not been installed.

14. The terminal device according to claim 8, wherein the starting, to import the migration data in the case that the terminal device has finished receiving the migration data comprises:

receiving second indication information from the another terminal device, wherein the second indication information indicates that all the migration data has been sent; and starting to import the migration data in a case of determining based on the second indication information that the migration data has been received.

15. A non-transitory computer-readable storage medium storing instructions that, when executed by a processor of a terminal device, cause the terminal device to perform operations comprising:

establishing a connection to another terminal device;

displaying a first interface based on the terminal device receiving migration data from the another terminal device, wherein the first interface comprises one or more of a data volume, a transmission progress, or a transmission time of the migration data;

starting to import the migration data in a case that the terminal device has finished receiving the migration data;

displaying a second interface in a process in which the terminal device imports the migration data, wherein the second interface comprises a first control;

displaying a first desktop in response to a user operation of selecting the first control, wherein the first desktop comprises a first icon of a first application and a first import progress of the first application, wherein an icon status of the first application is a first status, wherein the first status comprises an installing state, and wherein the installing state is a state of installing the first application; and updating the icon status of the first application to a second status on the first desktop based on a change of the import progress of the first application, wherein the second status comprises a second icon of the first application and a second import progress, wherein the second status comprises an importing state, wherein the importing state is a state of importing application data to the first application after the first application is installed, wherein the application data comprises user-specific data for the first application included in the migration data from the another terminal device.

16. The method according to claim 1, wherein the application data comprises one or more of an address book, chat records, or collection contents for the first application included in the migration data from the second terminal device.

17. The terminal device according to claim 8, wherein the application data comprises one or more of an address book, chat records, or collection contents for the first application included in the migration data from the another terminal device.

18. The computer-readable storage medium according to claim 15, wherein the application data comprises one or more of an address book, chat records, or collection contents for the first application included in the migration data from the another terminal device.

* * * * *